United States Patent
Krumme et al.

[11] Patent Number: 5,842,312
[45] Date of Patent: Dec. 1, 1998

[54] HYSTERETIC DAMPING APPARATI AND METHODS

[75] Inventors: Robert C. Krumme, Berkeley; Darel E. Hodgson, Palo Alto, both of Calif.

[73] Assignee: **E*Sorb Systems**, Berkeley, Calif.

[21] Appl. No.: 397,605

[22] Filed: Mar. 1, 1995

[51] Int. Cl.$^6$ ................................................ E04B 1/98
[52] U.S. Cl. .................................... 52/167.1; 248/634
[58] Field of Search .............................. 52/167.1, 167.3, 52/167.4; 248/634, 638

[56] References Cited

U.S. PATENT DOCUMENTS

| | | | |
|---|---|---|---|
| 3,794,277 | 2/1974 | Smedley et al. | 52/167.1 X |
| 3,797,183 | 3/1974 | Kobayashi et al. | 52/167 |
| 4,030,298 | 6/1977 | Sandoval | 60/527 |
| 4,055,955 | 11/1977 | Johnson | 60/527 |
| 4,117,637 | 10/1978 | Robinson | 52/167 |
| 4,121,393 | 10/1978 | Renault et al. | 52/167 |
| 4,125,978 | 11/1978 | Schlidge, Jr. | 52/223 R |
| 4,246,754 | 1/1981 | Wayman | 60/527 |
| 4,249,352 | 2/1981 | Marchaj | 52/167 |
| 4,275,561 | 6/1981 | Wang | 60/527 |
| 4,371,143 | 2/1983 | Ishida et al. | 52/167.1 X |
| 4,380,574 | 4/1983 | Gessinger et al. | 428/686 |
| 4,405,387 | 9/1983 | Albrecht et al. | 148/11.5 R |
| 4,411,711 | 10/1983 | Albrecht et al. | 148/11.5 A |
| 4,416,706 | 11/1983 | Albrecht et al. | 148/11.5 C |
| 4,483,426 | 11/1984 | Tagawa et al. | 188/378 |
| 4,499,694 | 2/1985 | Buckle et al. | 52/167 |
| 4,518,444 | 5/1985 | Albrecht et al. | 148/402 |
| 4,533,109 | 8/1985 | Delam | 248/542 |
| 4,593,501 | 6/1986 | Delfosse | 52/167 |
| 4,630,412 | 12/1986 | Engstrom et al. | 52/1 |
| 4,638,609 | 1/1987 | Csak | 52/167 |
| 4,651,481 | 3/1987 | Csak | 52/167 |
| 4,665,906 | 5/1987 | Jervis | 128/92 YN |
| 4,716,696 | 1/1988 | Yacoboni | 52/169.9 |
| 4,720,944 | 1/1988 | Loicq | 52/1 |
| 4,731,966 | 3/1988 | Fujita et al. | 52/167 |
| 4,761,955 | 8/1988 | Bloch | 60/528 |
| 4,785,627 | 11/1988 | Al-Jaroudi | 60/527 |
| 4,807,840 | 2/1989 | Baker et al. | 248/559 |
| 4,899,323 | 2/1990 | Fukahori et al. | 367/176 |
| 4,901,486 | 2/1990 | Kobori et al. | 52/167 |
| 4,910,930 | 3/1990 | Way | 52/167 |

OTHER PUBLICATIONS

"Search Results".
Darel E. Hodgson, et al., "Shape Memory Alloys", pp. 897–902.
C.M. Jackson, et al., *55–Nitinol—The Alloy With a Memory: Its Physical Metallurgy, Properties, and Applications*, NASA—SP 5110, National Aeronautics and Space Administration, Washington, D.C. 20402, 1972.
Darel E. Hodgson, *Using Shape Memory Alloys*, Shape Memory Applications, Inc., Sunnyvale, CA., 1988.

(List continued on next page.)

*Primary Examiner*—Beth Aubrey
*Attorney, Agent, or Firm*—Skjerven, Morrill, MacPherson, Franklin & Friel LLP; Thomas S. MacDonald; Omkar K. Suryadevara

[57] ABSTRACT

A damping apparatus and method uses one or more tension elements fabricated from shape memory alloy to cycle through a superelastic stress-strain hysteresis to provide energy dissipation. The method and apparatus can be used for damping of any structures, such as machine parts, building structures, offshore platforms, and nanostructures that are subject to any type of vibration, such as acoustic, seismic, blast, impact, wave and wind. The tension elements can be wire loops or bands that are prestretched into approximately the middle of the stress-strain hysteresis. Such a damping apparatus can be designed to have any selected stroke or force capacity by adjusting the length, thickness and number of the tension elements. Moreover, any type of complex force-deflection hysteresis can be designed, for example, a triangular flag, a rectangle, a rectangular flag, a bowtie, or a staging characteristic that provides for hardening or softening.

51 Claims, 15 Drawing Sheets

OTHER PUBLICATIONS

E.J. Graesser, et al., *Multidimensional Models Of Hysteretic Material Behavior For Vibration Analysis Of Shape Memory Energy Absorbing Devices*, Technical Report NCEER—89–0018, National Center For Earthquake Engineering Research, State University of New York at Buffalo, Red Jacket Quadrangle, Buffalo, NY 14261, Jun. 7, 1989.

E. J. Graesser, et al., *A Multidimensional Hysteretic Model for Plastically Deforming Metals in Energy Absorbing Devices*, Technical Report NCEER—91–0006, National Center For Earthquake Engineering Research, State University of New York at Buffalo, Red Jacket Quadrangle, Buffalo, NY 14261, Apr. 9, 1991.

P.R. Witting, et al., *Shape Memory Structural Dampers: Material Properties, Design and Seismic Testing*, Technical Report NCEER—92–0013, National Center For Earthquake Engineering Research, State University of New York at Buffalo, Red Jacket Quadrangle, Buffalo, NY 14261, May 26, 1992.

E.J. Graesser, et al., "A Proposed Three–Dimensional Constitutive Model for Shape Memory Alloys", *Journal of Intelligent Material Systems and Structures*, vol. 5, Jan. 1994, pp. 78–89.

Peter Randolph Witting, *Rate–Sensitive Shape Memory Constitutive Model: Theory and Experimental Verification*, State University of New York at Buffalo, Buffalo, NY 14261, Feb. 1994.

Mark E. Lauermann, *Temperature Dependence of Material Parmeters in a Shape Memory Constitutive Law for Nitinol*, State University of New York at Buffalo, Buffalo, NY 14261, Feb. 1994.

J.M. Kelly, et al., "A Review of Current Uses of Energy–Absorbing Devices", Technical Report No. UCB/EERC—79/10, The Design of Steel Energy Absorbing Restrainers and Their Incorporation into Nuclear Power Plants for Enhanced Safety, vol. 4, Earthquake Engineering Research Center, College of Engineering, University of California, Berkeley, CA 94720, Feb. 1979.

Ian D. Aiken, et al., "Comparative Study of Four Passive Energy Dissipation Systems", Bulletin of the New Zealand National Society for Earthquake Engineering, vol. 25, No. 3, Sep. 1992, pp. 175–192.

HYSTERETIC DAMPING APPARATI AND METHODS

FIELD OF THE INVENTION

This invention relates to methods and apparati using hysteretic behavior of shape memory alloys for dissipating kinetic energy introduced into any structure or mechanical system by any kind of dynamic excitation including acoustical, seismic, blast, impact, inertial and wind loading. In particular, this invention relates to such use of one or more tension elements fabricated from any shape memory alloy to cycle through the superelastic stress-strain hysteresis to provide energy dissipation.

BACKGROUND OF THE INVENTION

Passive damping methods or apparati can use a wide variety of mechanical energy dissipation techniques such as, friction, extrusion, plastic deformation of metals, viscous flow and viscoelasticity. The utility of each passive damping method or apparatus is limited by the damping (also referred to as energy dissipation) technique used in the method or apparatus. Properties of a passive damping or energy dissipation technique include for example the nature of the force/deflection curve (also called hysteretic behavior), controllability and shape, reliability, predictability, fatigue characteristics, corrosion resistance, temperature sensitivity, specific damping per unit mass and per unit volume.

Each of the passive methods and apparati suffers from various defects and limitations including unreliability, vulnerability to harsh or corrosive environments, poor maintainability, imprecise or variable kinetic energy absorption levels, poor fatigue resistance, limited or uncertain dynamic response and limited capacity to dissipate heat generated by the kinetic energy absorption.

A disadvantage of many passive damping methods and apparati is that the damped structure is left in a randomly determined deflected state after a dynamic loading event of sufficient magnitude to induce operation of the method or apparatus. However, in the case of some devices, for example, viscoelastic damping devices, the damped structure does recover the original undeflected state but only over an extended period of time, via creep. Other limitations of conventional passive damping methods and apparati include a limited and in most cases a single force-deflection behavior, frequency dependency of the force-deflection behavior, and excessive temperature sensitivity, poor cyclic fatigue behavior, poor reliability and poor response predictability.

Methods and apparati for passive damping are used with a variety of damped structures, including, for example, machine parts, bridges, building structures, offshore platforms and micro-mechanical nanostructures in which energy is dissipated by hysteretic cycling through a force/deflection hysteresis. Several conventional damping apparati and methods are described in, for example, "Review of Current Uses of Energy Absorbing Devices" by Kelly, J. M. and Skinner M. S. Volume 4 of Technical Report UCB/EERC-79/10 entitled "The Design of Steel Energy Absorbing Restrainers and Their Incorporation Into Nuclear Power Plants For Enhanced Safety," Earthquake Engineering Research Center, College of Engineering, University of California, Berkeley, Calif. 94720. This Kelly Technical Report classifies energy absorbing devices into at least four groups according to energy-absorbing mechanism: (1) plastic deformation of metals, (2) extrusion, (3) friction, and (4) metal cutting.

One typical conventional example of a damped structure is a building. In the event of an earthquake, the structural vibratory response and associated structural damage of the building can be reduced by incorporating energy absorbing devices into building design, for example as described in "Multidimensional Models of Hysteretic Material Behavior For Vibration Analysis of Shape Memory Energy Absorbing Devices" by E. J. Graesser and F. A. Cozzarelli, Technical Report NCEER-89-0018, National Center for Earthquake Engineering Research, State University of New York at Buffalo, Red Jacket Quadrangle, Buffalo, N.Y. 14261, Jun. 7, 1989.

One potentially useful class of materials being considered, for example in the Grasser Technical Report NCEER-89-0018 referenced above, are shape memory alloys (also called SMA's). The SMA's are a class of metals which are characterized by the so called "shape memory effect" that results from a first order thermoelastic martensitic phase transformation.

FIG. 1 shows shape-memory hysteresis 10 (e.g. the stress-strain relationship) of a SMA at a temperature $T<M_f$, where $M_f$ is the martensitic finish temperature wherein the alloy's microstructure is fully in martensitic phase. This shape-memory stress-strain hysteresis 10 is characterized by a large hysteresis loop similar to that exhibited by conventional steels. However, hysteresis 10 which results from cyclic loading is not due to dislocation glide as in most metals. Rather, hysteresis 10 is due to deformation of martensite phase which occurs by reorientation, growth, and shrinkage of individual twin variants of martensite (of which there are 24). If strained sufficiently only one martensite variant remains in each grain, or crystal, of parent material. This martensite variant reverts uniquely to the original parent crystal orientation upon the application of heat, thus the memory effect. There is an inherent resistance to the movement of twin boundaries during deformation of the martensite. Thus the hysteresis of FIG. 1 results even though no permanent damage is done to the shape memory alloy because movement of the twin interfaces does not damage the structure of the shape memory alloy.

FIG. 2 shows the superelastic behavior 11 of the SMA at temperatures $T>A_f$ which ideally provides a hysteretic effect and has zero residual strain upon unloading. $A_f$ is the austenite finish temperature above which the microstructure is fully austenitic. This superelastic behavior 11 results from the elastic loading of a stable austenitic phase up to a threshold stress whereupon a stress induced transformation from austenite to martensite takes place. This transformation process occurs at relatively constant stress thus giving the appearance of a yield plateau. As deformation proceeds beyond the threshold strain caused by the threshold stress, the volume of martensite within the microstructure increases and the path of the stress-strain curve follows a relatively constant horizontal stress.

As the microstructure of a superelastic shape memory alloy becomes fully martensitic, the horizontal stress plateau ends and further straining will cause the martensite to be loaded elastically at a modulus lower than that of elastic austenite but much higher than that of the phase transformation portion of the loading curve. Since the martensite is stable only due to the presence of the applied stress, a reverse transformation takes place upon unloading, but at a lowered and approximately horizontal stress plateau. Ideally, after full unloading, the SMA material returns to its original undeformed geometry. This remarkable process yields a cyclic stress-strain hysteresis with zero residual strain at the end of the cycle and thus motivates the associated term "superelasticity".

Some promising characteristics of the two modes of SMA behavior 10 and 11 (FIGS. 1 and 2) include high stiffness for small strain levels for superelastic material (elastic loading), reduced stiffness for intermediate levels of strain (due to formation and/or reorientation of martensite), and high stiffness at large levels of strain (elastic loading of martensite). Also, since the superelastic material ideally displays a hysteretic effect with nearly zero residual strain, an energy absorbing damping device made from this material would theoretically provide a centering force for the building following a seismic event.

Another advantage of the shape memory alloys as damping materials is that shape memory alloys can tolerate a large number of strain cycles without exhibiting a significant change in their mechanical behavior.

The Grasser Technical Report NCEER-89-0018 referenced above recognizes that a SMA may also be a potentially functional candidate for use in the design of structural damping devices due to its potentially large damping capacity as well as its relative insensitivity to environmental temperature changes.

The hysteretic behavior observed in the energy absorbing devices can be markedly different from the observed vibrational behavior in the structural framing members of buildings. Energy absorbing devices may typically experience repeated deformation excursions well into the inelastic range whereas the deformation encountered in steel framing members and structural joints is either elastic or locally plastic.

Several earthquake simulation studies of structures with SMA energy absorbing devices have been carried out. At the Earthquake Engineering Research Center of the University of California, a 3-story steel model was tested with Nitinol (a nickel titanium alloy) tension devices as part of a cross-bracing system, as described in, "Comparative Study Of Four Passive Energy Dissipation Systems", by Aiken, I. D., et al., "Bulletin New Zealand National Society For Earthquake Engineering", 25 (3) September 1992. Moreover, at the National Center for Earthquake Engineering Research, a 5-story steel model was tested with copper-zinc-aluminum SMA devices, as described in, for example, "Shape Memory Structural Dampers: Material Properties, Design And Seismic Testing", by Witting, P. R. and Cozzarelli, F. A., Technical Report NCEER-92-0013, National Center For Earthquake Engineering Research, State University of New York at Buffalo, Red Jacket Quadrangle, Buffalo, N.Y. 14261, May 26, 1992. This Witting Technical Report NCEER-92-0013 showed that the SMA energy absorbing dissipators were effective in reducing the seismic responses of the models. The Witting Technical Report describes at least four SMA dissipators, including a bar in torsion, a beam in bending mode, an axially loaded beam and a clamped plate loaded in the center.

The devices described above incorporate rigid monolithic elements of SMA subject to failure by buckling and other modes and which must be custom designed and fabricated for each structure to be damped. Such specific design and fabrication makes these devices expensive, limited in the range of response and not at all versatile.

SUMMARY

A damping (also referred to as "energy dissipation") method or apparatus in accordance with this invention uses superelastic properties of a shape memory alloy in the form of tension elements (of any number, length and prestress), to provide energy dissipation for damping of any structures, such as machine parts, building structures, towers, bridges, offshore marine platforms and micro-mechanical nanostructures that are subject to dynamic excitation of any type, including acoustical, seismic, blast, impact, wave and wind loading. Energy dissipation is accomplished when relative motion between components of a mechanism that supports the tension elements causes the shape memory alloy to cyclically traverse at least a portion of a superelastic stress-strain hysteresis created by phase transformation of the shape memory alloy.

The novel energy dissipation methods and apparati as described above have several advantages. A first advantage of this invention is a user selectable force-deflection hysteresis provided by the hysteretic damping apparatus, as compared to prior art energy dissipation methods and apparati. For example, plastic flow and re-crystallization of lead enforces a simple bilinear elastic-plastic force-deflection hysteresis on devices that exploit this method of energy dissipation.

In contrast, energy dissipation methods and apparati in accordance with this invention can be designed to provide a wide variety of force-deflection hysteresis, depending on the specific needs of a given application. A variety of damping apparati in a large number of potential configurations can be designed using or combined by a multitude of shape memory alloy tension elements that have easily varied length and number for adjusting the stroke and force capacity. A force-deflection hysteresis of any shape can be designed, for example, a triangular flag, a rectangle, a rectangular flag, a bow tie, or staging hysteresis, such as hardening or softening at any deflection. Moreover, any number of the novel energy dissipation methods and apparati can be combined in a variety of configurations by well known structural and mechanical apparati and methods.

A second advantage is increased energy dissipation capacity, as compared to prior art methods and apparati. For example, damping with prior art viscoelastic devices is limited by low stress capacity and consequent requirement for large strains to achieve high dissipation levels, as well as temperature sensitivity to the attendant heat buildup. In contrast, apparati and methods that use one or more tension elements formed of shape memory alloy provide higher permissible energy dissipation per cycle, as well as per unit mass and per unit volume, than the prior art devices.

A third advantage of the novel methods and apparati is the increased reliability of energy dissipation, as compared to the prior art. For example, viscoelastic or plastic flow and recrystallization of lead provide poor reliability and predictability due to sensitivity to uncontrolled parameters, such as temperature, or to the inherently stochastic nature of the process. In contrast, shape memory alloy tension elements of this invention provide substantially improved reliability, predictability and repeatability of energy dissipation over an extremely large number of cycles, based on a reliable, consistent and predictable phase transformation hysteresis.

A fourth advantage of this invention is the increased resistance to fatigue, corrosion and radiation damage, as compared to the prior art. Corrosion resistance of shape memory alloys, such as nickel-titanium, provides a substantial advantage over prior art methods such as plastic flow of mild steel. Additionally, certain shape memory alloys, for example, the nickel titanium family show excellent resistance to corrosion and radiation damage.

Moreover, the absence of plastic flow in methods and apparati in accordance with this invention provides an extraordinary fatigue life. Tension elements formed of shape memory alloys have the ability to "yield" repeatedly without sustaining any permanent deformation. This is because the material undergoes a reversible phase transformation as it deforms rather than irreversible dislocation motion, which is typical of steel. Thus, the applied load induces a crystal phase transformation, which is reversed when the load is removed. This provides for simple devices which are self-centering and which perform repeatedly for a large number of cycles.

A fifth advantage of this invention is the automatic return of a damped structure after the dynamic loading event to the original undeflected state, because of the tension elements' superelastic stress-strain hysteresis.

A hysteretic damping apparatus in accordance with this invention includes at least one tension element formed of a shape memory alloy and a mechanism for supporting the tension element, wherein relative motion in the mechanism cycles the tension element through the superelastic stress-strain hysteresis of the shape memory alloy to provide damping. The relative motion can be caused by vibration of a structure to be damped due to application of a dynamic loading to the structure.

In using the above described hysteretic damping apparatus, the user performs the following steps. In the first step, the user determines an appropriate expected dynamic loading of a structure to be damped. In the second step, the user selects a force-deflection hysteresis for dissipating energy generated by the expected dynamic loading. In the third step, the user selects a hysteretic damping apparatus of the types described below, such that the hysteretic damping apparatus has a response that approximates the selected force-deflection hysteresis. In the fourth step, the user selects physical properties of the tension elements included in the hysteretic damping apparatus. The physical properties are selected so that when the tension elements are cycled through the superelastic stress-strain hysteresis the hysteretic damping apparatus dissipates at least a portion of the generated energy. In the fifth step, the user couples a hysteretic damping apparatus to the structure to be damped.

The selectable physical properties of the tension elements include, for example, shape memory alloy composition, the heat treatment, number, shape, size and configuration and connection of tension elements. The tension elements are made specific to each application, depending on the selected force-deflection hysteresis and on a set of auxiliary performance attributes, such as fatigue life, corrosion resistance, temperature sensitivity and reliability.

As an example, a hysteretic damping apparatus selected by a user can include a block-and-tackle mechanism and tension elements in the form of multiple loops of shape memory alloy wire, to provide a rectangular flag force-deflection hysteresis. The length of the loops can be selected to yield the stroke necessary to create the selected force deflection hysteresis. The number of loops can be selected to provide a supportable force needed to create the selected hysteresis. Additionally, a user can select the shape of the force-deflection hysteresis by staging, e.g. by having some loops tighter than other loops.

In a first embodiment, the block-and-tackle mechanism includes two stirrups in the form of U shaped frames with cylinders, and tension elements in the form of multiple loops of shape memory alloy wire wound between the two stirrups. Relative motion between the stirrups can stretch the loop to provide damping of the relative motion.

In any hysteretic damping apparatus (including the first embodiment), tension elements can be prestretched into a strain range approximately in the middle of the superelastic stress-strain hysteresis. When prestretched by a prestress, the tension elements can absorb either a deflection that extends the tension elements or alternatively a deflection that contracts the tension elements, while they still remain under tension.

A tension element of a damping apparatus in accordance with this invention can have any form, such as a flattened or round wire, a band, or a bar, in addition to a wire (above). A band and a wire have a larger surface area per unit volume that can more easily dissipate the heat generated by cycling through a shape memory alloy's hysteresis, as compared to a bar. A hysteretic damping apparatus can include one or more staging tension elements that are successively engaged at selected critical points during the movement of a moveable component, thereby providing a staging effect. For example, a number of slack tension elements can provide a hardening effect in the response of a hysteretic damping apparatus to a deflection beyond the critical point.

In a second embodiment, the hysteretic damping apparatus is "center-tapped" by coupling a moveable component of the mechanism centrally between two parallel prestretched tension elements, such that when the movable component is moved in a direction parallel to the longitudinal (i.e. tension) axis of a tension element, one tension element elongates while the other tension element contracts. A single tension element can be used in a center-tapped damping apparatus instead of two tension elements, by coupling the movable component to the center of the single tension element. Such a center-tapped damping apparatus supplies an equal amount of force, irrespective of the direction of relative motion.

A longitudinal slider mechanism for the centertapped damping apparatus can include a first frame that slides, for example on a support rail, with respect to a second frame. Two groups of tension elements in the form of shape memory alloy bands couple the first frame to the second frame such that relative motion in a first direction is opposed by bands in a first group while relative motion in a second direction is opposed by bands in the second group. A rectangular flag hysteresis can be generated by use of the longitudinal slider mechanism in the absence of a prestress in the tension elements. A rectangular flag hysteresis is useful for wind damping applications that require damping of moderate wind loads, yielding for large wind loads such as hurricanes or other windstorms, followed by strain hardening for excessive loading.

A rectangular hysteresis can be generated by use of the longitudinal slider mechanism when the tension elements are prestretched to a level part way through the superelastic strain range of the superelastic stress-strain hysteresis. The rectangular hysteresis offers the maximum amount of damping for a given level of force that is useful in many existing structures where the amount of damping force is limited by the buckling capacity of the members of the structure. A rectangular hysteresis apparatus exerts a constant maximum force for any deflection in the hysteresis and therefore dissipates the maximum possible amount of energy dissipation.

In a third embodiment the mechanism is a transverse slider mechanism that includes the first and second components rigidly coupled to each other. The transverse slider mechanism includes a push-pull rod mounted approximately parallel to and between the first and second components. The push-pull rod has a number of transverse slots and the tension elements are supported within the slots. The transverse slider mechanism provides a "triangular flag" shaped force-deflection hysteresis. The triangular flag hysteresis can be approximated readily by a linear model that facilitates easy design of stable control systems. Another advantage is that the triangular flag hysteresis minimizes the deflections for a random loading in a root mean square sense. Further, as the triangular flag hysteresis goes through the origin, a third embodiment device can supply small forces to accommodate small motions of structures that are, for example, induced by temperature changes. Moreover, a third embodiment device provides a linear elastic restoring force that can automatically restore a damped structure to the undeflected state prior to application of the dynamic loading.

In a fourth embodiment, a multi-slider mechanism includes a rectangular hysteresis mechanism, such as the longitudinal slider mechanism described above or a coulomb friction damper coupled to a slider that is constrained to reciprocate transverse to the longitudinal axis of the tension elements in the longitudinal slider. A fourth embodiment apparatus, for example of the type described above results in a force-deflection hysteresis having a "bowtie" shape. A bowtie hysteresis has a mathematical model that is nonlinear but homogeneous and that facilitates the design of stable and predictable control systems. The bowtie hysteresis also minimizes the deflections for any random (or stochastic) loading such as earthquakes or windstorms in a root mean square sense.

In a fifth embodiment, the mechanism is a draft-gear mechanism that includes a push-pull rod slidably mounted between two slotted discs. The slotted discs are separated from each other by one or more stops in the mechanism that allows relative motion of the slotted discs away from each other. The tension elements are arranged parallel to the push-pull rod and are supported within the slots of the two discs. Relative motion of the push-pull rod moves one slotted disc while the other slotted disc is restrained, thereby elongating the tension elements. The draft-gear mechanism eliminates the need for prestretching of tension elements because the same tension elements are stretched irrespective of the direction of the relative motion. The draft gear mechanism provides a "rectangular-flag" shaped force-deflection hysteresis.

Although five mechanisms involving linear reciprocatory relative motion have been described above, the relative motion can be of other types, such as rotary. In a sixth embodiment the mechanism is a torsion mechanism that includes a central shaft and two discs supported by the central shaft at a distance from each other. Both discs have a number of posts mounted on the periphery, and one disc is mounted rotatably with respect to the other disc. Tension elements in the form of multiple bands are arranged substantially parallel to the central shaft between posts of the two discs in one variant of the sixth embodiment. In another variant, the tension elements are arranged oblique relative to the central shaft, and each tension element crosses another tension element so that this variant can be "parked" at any angle as described below.

DETAILED DESCRIPTION

Figure 1:
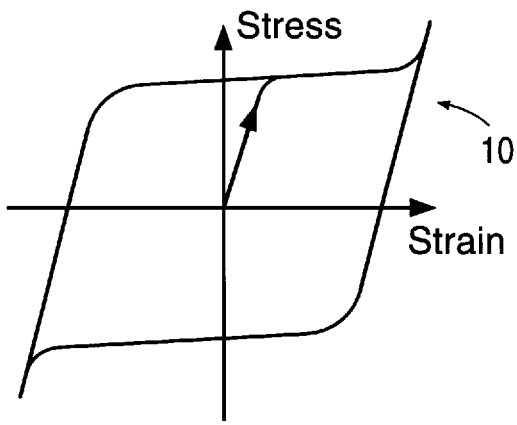
FIGS. 1 and 2 illustrate hystereses (stress-strain relationships) of a prior art shape memory alloy.
Figure 2:
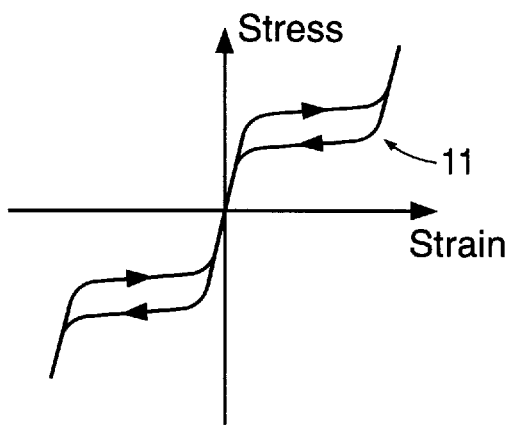

Hysteretic damping methods and apparati of this invention use one or more tension elements fabricated from shape memory alloy to cycle through the superelastic stress-strain hysteresis to provide energy dissipation. The tension elements can be used in a wide variety of shapes, sizes and configurations to achieve any selected force-deflection hysteresis by using or combining one or more apparati or methods of the type described herein. The tension elements are formed of shape memory alloy, such as NiTi (for example Nitinol), CuZnAl, CuAlNi, and FeMnSi. The composition of the shape memory alloy can be chosen to achieve various characteristics, for example, NiTi alloys have superior mechanical properties (for example, cyclic fatigue behavior), as compared to most other shape memory alloys, whereas copper-based and iron-based alloys are more economical than NiTi.

Shape-Memory Alloys (SMAs or SMMs) are a class of alloys that display a characteristic thermoelastic martensitic phase transformation and a Transformation Temperature Range (TTR), which is specific to each alloy. As these alloys are cooled through their TTR, they transform from the higher temperature austenite phase to the lower temperature martensite phase. Over a dozen alloy families have been shown to exhibit this transformation, and each of these families has many specific compositions, each of which possesses unique mechanical and transformation properties. Most of the alloys have a long-range ordered atomic structure, and some are clearly intermetallic compounds with extremely narrow compositional ranges. For the purposes of this study, there are five primary alloy systems of significant interest. These are the Nickel-Titanium family (often called Nitinol); two copper-based systems, CuZnAl and CuAlNi; FeMnSi alloys; and some special stainless steel compositions.

In each of the SMAs, the austenite form is a relatively simple cubic lattice at the atomic level. If deformed, the austenitic alloy strains by standard dislocation mechanisms in a permanent manner. In the martensitic state, however, the material assumes a more complex crystal structure, such as monoclinic or orthorhombic, and tends to exist in alternate twin bands of opposite crystal tilt if cooled under zero stress.

There are two primary features of SMAs of interest, irrespective of alloy type. The first of these is called the Shape Memory Effect (SME), which occurs if the alloy is strained in shear at a temperature below its TTR. As long as the shear strain is less than a critical strain for the particular alloy, the strain can be accommodated in the alloy by a twin re-orientation process; no dislocation motion or permanent damage occurs at the atomic level. Upon heating the strained structure, each of the twinned elements reverts to the original austenitic crystal structure, and any imposed strain is lost; the material reverts to its pre-strained shape and the shape memory effect is observed. The reversion of the martensitic to the austenite is a first-order phase change with a strong driving force. For this reason, the shape recovery occurs with a large mechanical force, and only a restraining force large enough to create permanent deformation in the austenitic parent will hinder shape recovery.

The second feature of the SMAs is called the Superelastic Effect (SEE). This effect is observed when a strain is imposed on an SMA material at a temperature slightly above its TTR. The alloy system can relieve the stress imposed on it by transforming to the thermally unstable martensite and allowing that martensite to strain as it is formed, thus creating a stress-induced martensite. Since this martensite is not thermally stable, as soon as the stress is lowered below the stress level required to create the martensitic form, the material may revert to the austenite and thus eliminate the strain in the stress-induced martensite. The stress at which the martensite undergoes a phase change to austenite is termed the reversion stress.

The superelastic stress-strain hysteresis disclosed herein includes the hysteresis from a distinct phase transformation referred to as an R-phase transition, which is also thermoelastic and produces both a shape-memory and a superelastic effect.

The composition of the tension elements can be chosen such that the transformation temperature at which an austenite phase of the shape memory alloy is transformed into a martensite phase is below the temperature at which the tension elements are expected to be operated. If necessary for a particular application, the tension elements can be heated above the ambient temperature, for example, by passage of current, i.e. by resistive heating or alternatively, cooled, for example, by convective or evaporative cooling methods.

Temperature control of shape memory alloy tension elements can be easily accomplished through resistive heating; properties related to temperature control (electrical resistivity, thermal conductivity, specific heat) are all available for NiTi and from commercial material suppliers.

The number of tension elements can be easily varied in the construction of a hysteretic damping apparatus, to give a variable load carrying capacity to the apparatus. Also, the length of the tension elements can be easily varied in construction of the hysteretic damping apparatus to give variable deformation stroke capacity to the apparatus.

The hysteretic damping apparatus can be installed so that tension in the tension elements tends to automatically restore the original shape of the structure to be damped, after a deformation so that the structure cycles the tension elements through the superelastic stress-strain hysteresis.

The tension elements can be installed prestretched to any length within the superelastic strain range (for example, approximately in the center of the range) such that either elongation or contraction of the prestretched tension elements followed by restoring the tension elements to their prestretched length converts mechanical work into heat in the tension elements.

Prestretched tension elements can be arranged in opposition to each other in an apparatus referred to as a center-tapped device such that extension of one prestretched tension element is assisted by contraction of the other prestretched tension element. A movable component of a hysteretic damping apparatus that is attached to two groups of opposing prestretched tension elements "parks" (i.e. remains stationary) in whatever position (called the "parked position") the movable component is placed and provides a rectangular force-deflection hysteresis for deflections from the parked position.

A hysteretic damping apparatus can be built such that either extension or compression between two components of the apparatus stretches the same tension elements in tension, as illustrated by a transverse slider mechanism (FIG. 10) and a draft gear mechanism (FIG. 14) described below. Such an apparatus provides significant economy of the shape memory alloy material needed for the tension elements, as compared to an apparatus that uses two groups of tension elements.

Relative motion of the components of a hysteretic damping apparatus that controls the position of the tension elements, can be transverse to the tension (i.e. longitudinal) axis of the tension elements. Such an apparatus provides a triangular flag force-deflection hysteresis, as compared to the rectangular flag force-deflection hysteresis is provided when relative motion is parallel to the tension axis of the tension elements.

Different elements in a hysteretic damping apparatus can have different levels of prestrain, or slack, to allow a user to "stage" (i.e. change) the rate at which the tension elements have an effect on the force-deflection hysteresis as a movable component of the apparatus is moved. Also, the tension elements can have a stepped or varying cross section such that the loading of the tension elements changes, for example, gradually increasing with increased deflection.

As tension elements are not subject to buckling from compressive loads, the tension elements can be formed in a variety of shapes such as wire bands and other thin section forms that have a high surface area per unit volume and thus dissipate heat energy better than other forms. Moreover, the use of tension elements that are held in tension is more advantageous than other uses, such as torsion, because of the greater efficiency of the use of the shape memory material. Also, the stress distribution is uniform all across the cross section of a tension element and therefore more advantageous than a torsion bar. Furthermore, the use of a tension element in tension does not involve buckling problems that are associated with other types of uses, such as torsion. Another advantage of tension elements is the use of the material fabrication techniques that provide superior metallurgical properties such as uniform grain size and structure as well as uniform thermomechanical processing across the cross section of a wire, as compared to other elements, such as torsional elements. Still another advantage is that by being flexible, the tension elements are not subjected to compressive loads and hence need not be designed to avoid buckling.

Hysteretic damping apparatus disclosed herein, permit modular extensible design in which a standard mechanism can simply and inexpensively be matched to the expected force-deflection, heat dissipation and other requirements without re-design or custom fabrication. For example, tension elements in the form of wire or bands can be flexibly installed into a modularly prefabricated mechanism by adding any number of loops of wire or band that are necessary to provide an expected force for the specific structure to be damped, from a large roll of wire or band. Use of such a roll of wire or band also allows the stroke of the prefabricated mechanism to be adjusted at the time of installation of the tension elements by use of, for example, wing nuts.

Figure 3:
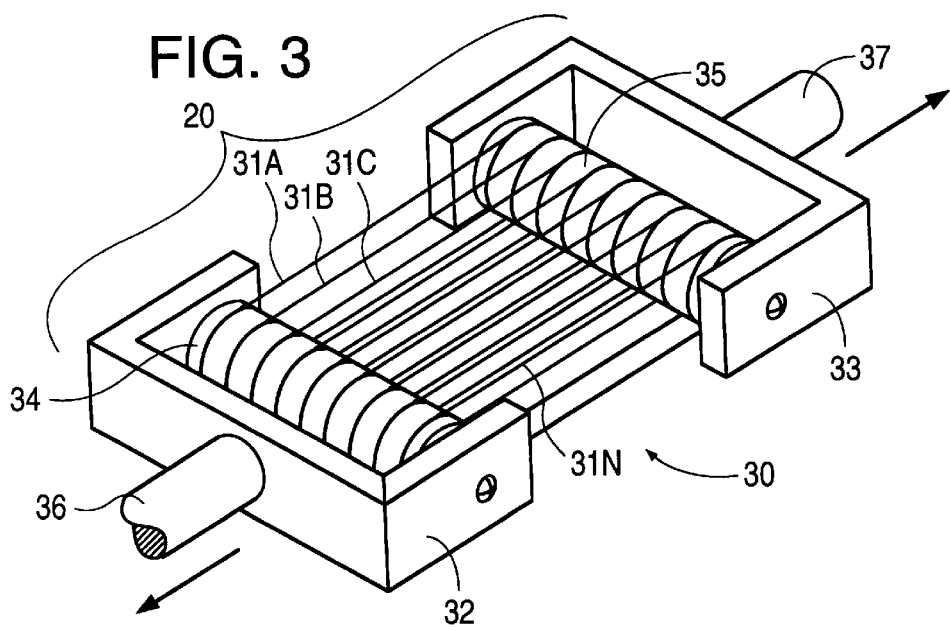
FIG. 3 is a perspective view of a block-and-tackle mechanism with tension elements in accordance with this invention.
Figure 14:
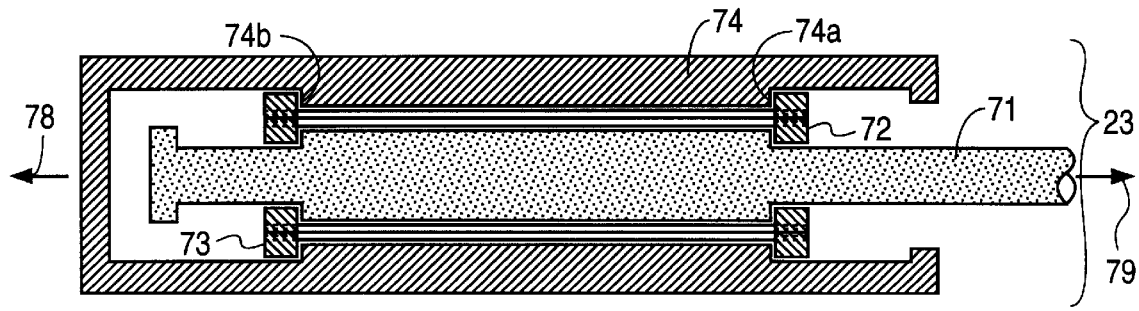
FIG. 14 is a cross-sectional view of a draft gear mechanism and tension elements in yet another damping apparatus embodiment.
Figure 17:
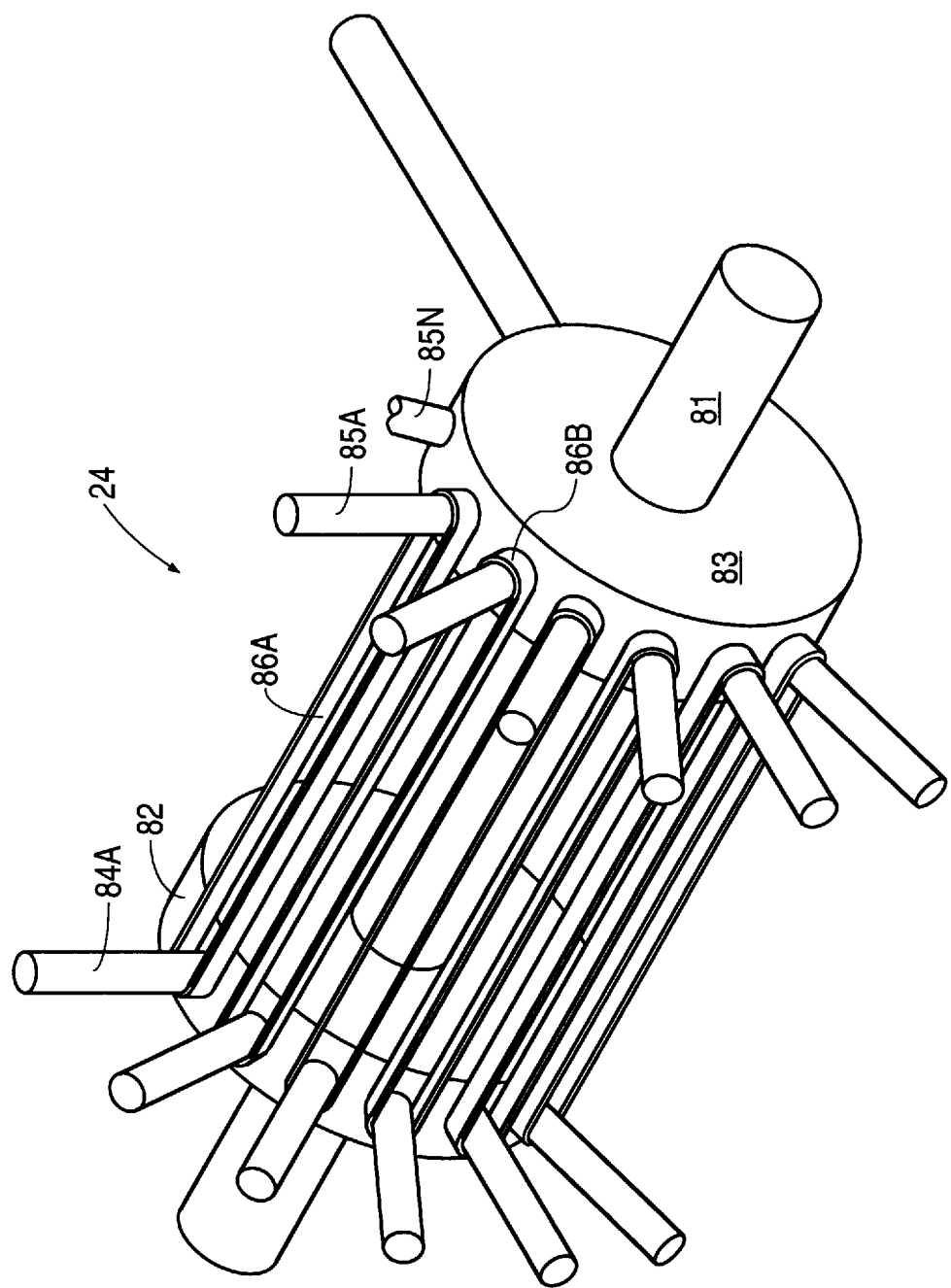
FIG. 17 is a perspective view thereof showing multiple loops of tension elements parallel to each other and to the central support shaft.

The tension elements can be combined in a variety of configurations, by use of one or more reciprocatory or rotary mechanisms. Reciprocatory mechanisms include, for example, block-and-tackle mechanism 20 (FIG. 3), longitudinal slider mechanism 21 (FIG. 6), transverse slider mechanism 22 (FIG. 10) and draft gear mechanism 23 (FIG. 14). Rotary mechanisms include, for example, a torsion mechanism 24 (FIG. 17). Although six specific mechanisms are disclosed herein, these six mechanisms are merely illustrative and not limiting. Numerous modifications, adaptations and combinations can be made based on the enclosed disclosure in view of other mechanisms well known in mechanical engineering.

As an example of a combination, a slider damping device having a rectangular force-deflection hysteresis can be mounted such that the linear motion of the device is transverse to the motion to be damped, to create a multi-slider mechanism 25 (FIG. 12) that can be used to provide a force-deflection hysteresis having a "bow tie" shape. The slider damping device can be, for example, a coulomb friction device, or a device that uses shape memory alloy tension elements such as longitudinal slider mechanism 21.

The design of a damping apparatus to provide a selected force-deflection hysteresis is made possible by the extreme versatility of the shape memory alloy tension elements and the concepts described herein. A user can determine mathematically the optimum force-deflection hysteresis for a given structure and the expected dynamic loading (i.e. vibration load excursion) and then readily create a hysteresis damping apparatus that provides a fitted approximation to the mathematically determined force-deflection hysteresis.

For example, a user can select a first embodiment 26 (FIG. 3) of a hysteretic damping apparatus that includes a number N of tension elements, such as wire loops 31A–31N of superelastic wire. A mechanism, such as block-and-tackle mechanism 20, includes two U shaped frames, called stirrups 32 and 33. Stirrups 32, 33 can be, for example, eyebolts. Stirrups 32 and 33 have cylindrical rods 34 and 35 that are coupled to each other by wire loops 31A–31N wrapped between them.

Stirrup 32 is coupled to a first structural portion, such as connector 36, while stirrup 33 is coupled to a second structural portion, such as connector 37, so that all loops 31A–31N are held taut, for example hand tightened, with a negligible amount of prestress in loops 31A–31N.

Any motion of the structure resulting in a relative extension between connectors 36 and 37 cycles the superelastic wires 31A–31N in tension through a superelastic stress-strain hysteresis. Relative motion of the structure which induces contraction of connector 36 relative to connector 37 results in buckling of wire loops 31A–31N and therefore no energy dissipation in the apparatus as per this design.

Figure 4:
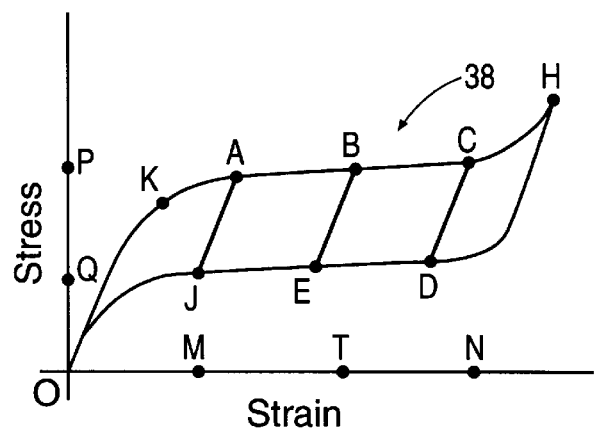
FIG. 4 illustrates a force-deflection hysteresis thereof.
Figure 5:
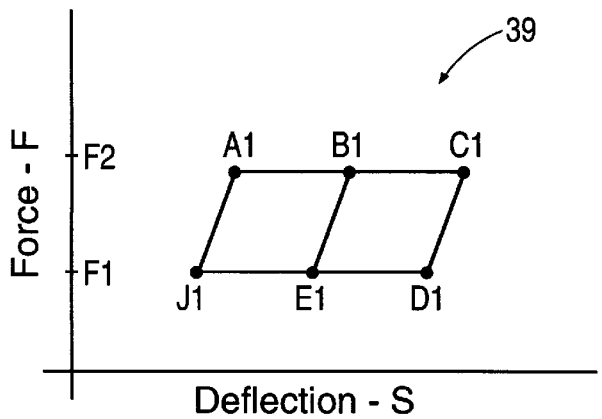
FIG. 5 illustrates a rectangular force-deflection hysteresis thereof.

FIG. 4 illustrates a superelastic stress-strain hysteresis 38 for a typical shape memory alloy (such as 51% Ni 49% Ti atomic composition, for example, alloy "BB" available from Raychem, 300 Constitution Avenue, Menlo Park, Calif.) that is used to form the superelastic wire of loops 31A–31N. The shape memory alloy dissipates kinetic energy from vibration by providing an opposing force F (FIG. 5) to resist deflection S corresponding to loading portion O-K-G-A-B-C of stress-strain hysteresis 38. Force F and deflection S depend on a force-deflection hysteresis generated by each hysteretic damping apparatus which hysteresis is specific to the mechanism and to the configuration of the tension elements in the apparatus. For example, block-and-tackle mechanism 20 can provide a rectangular force-deflection hysteresis 39 (FIG. 5), corresponding to the stress-strain hysteresis 38 (FIG. 4). Most reference numerals in FIG. 5 are derived from corresponding reference numerals in FIG. 4 by appending a "1".

The loading portion of stress-strain hysteresis 38 comprises an initial elastic segment O-K, an abrupt yielding segment K-A, a horizontal loading stress plateau A-B-C that occurs at an approximately constant stress P and a hardening segment C-H. The deformation in loading plateau A-B-C is accommodated by a twinning mechanism and not by conventional plastic strain. The twinning mechanism is due to stress induced phase transformation of the shape memory alloy, for example, from austenite to martensite.

An unloading or recovery phase of stress-strain hysteresis 38 comprises an elastic unloading segment H-D, a horizontal unloading stress plateau D-E-J that occurs at approximately constant stress Q and a softening segment J-0. The strain recovery in unloading plateau D-E-J is accomplished by a phase transformation, for example, of stress induced martensite to austenite, which recovers repeatably 100% of the induced strain.

Various cycles of superelastic hystereses, e.g. hysteresis A-B-E-J, that is a subset of hysteresis 38 can be used, depending on the maximum induced strain. The amount of kinetic energy converted to heat by tension elements 31A–31N is calculated as the area enclosed by hysteresis 38 that is traversed during the vibration that generates the kinetic energy.

During cyclic movement around a superelastic hysteresis, the shape memory alloy behaves elastically, i.e. all strain is recovered despite a seemingly inelastic deformation e.g. loading plateau A-B-C. The cyclic energy absorption —i.e. hysteretic damping — in a superelastic stress-strain hysteresis as described above in reference to FIG. 4 forms the basis of many embodiments of this invention. Hysteresis 38 can be exploited by any structures to be damped, such as building structures or machine part structures to absorb kinetic energy i.e. damp dynamic loadings such as earthquake, blast, wind and acoustic loadings. The particular nature of an apparatus that exploits a superelastic hysteresis for damping varies depending on a number of factors, such as the nature of the structure to be damped and the characteristics of the expected dynamic loading, such as amplitude, stroke and frequency.

Note that throughout a hysteretic cycle such as hysteresis 38 the tension elements are constantly under varying levels of tension. Even though the tension elements are operated in tension, hysteretic damping apparati can be designed to generate various force-deflection hysteresis. Stress-strain hysteresis 38 can be used by an apparatus to generate a rectangular force-deflection hysteresis that is wholly in the first quadrant (e.g. FIG. 5 to only resist a tension force). Stress-strain hysteresis 38 can also be used by an apparatus to generate a rectangular force-deflection hysteresis centered at the origin (e.g. FIG. 8 to resist tension and compressive forces).

A typical use for first embodiment 20 is in cross-bracing links in framed buildings (not shown). Under most dynamic loadings and damping levels, first embodiment 30 in FIG. 3 cyclically deflects in a first direction, e.g. the left and then in an opposite direction, e.g. the right. To accommodate the deflections in two opposite directions, tension elements 31A–31N can be prestretched, (for example by using a turnbuckle between a connector 37 and the point of attachment of connector 37 to the structure to be damped) into the center of a superelastic strain range (for example strain T in FIG. 4). A superelastic strain range is the range M–N (FIG. 4) in which the stress induced phase transformation takes place. Prestretching allows tension elements 31A–31N to either elongate or contract elastically from their prestretched length and still remain in tension to cycle around a superelastic stress-strain hysteresis and dissipate kinetic energy from vibrations.

Figure 18:
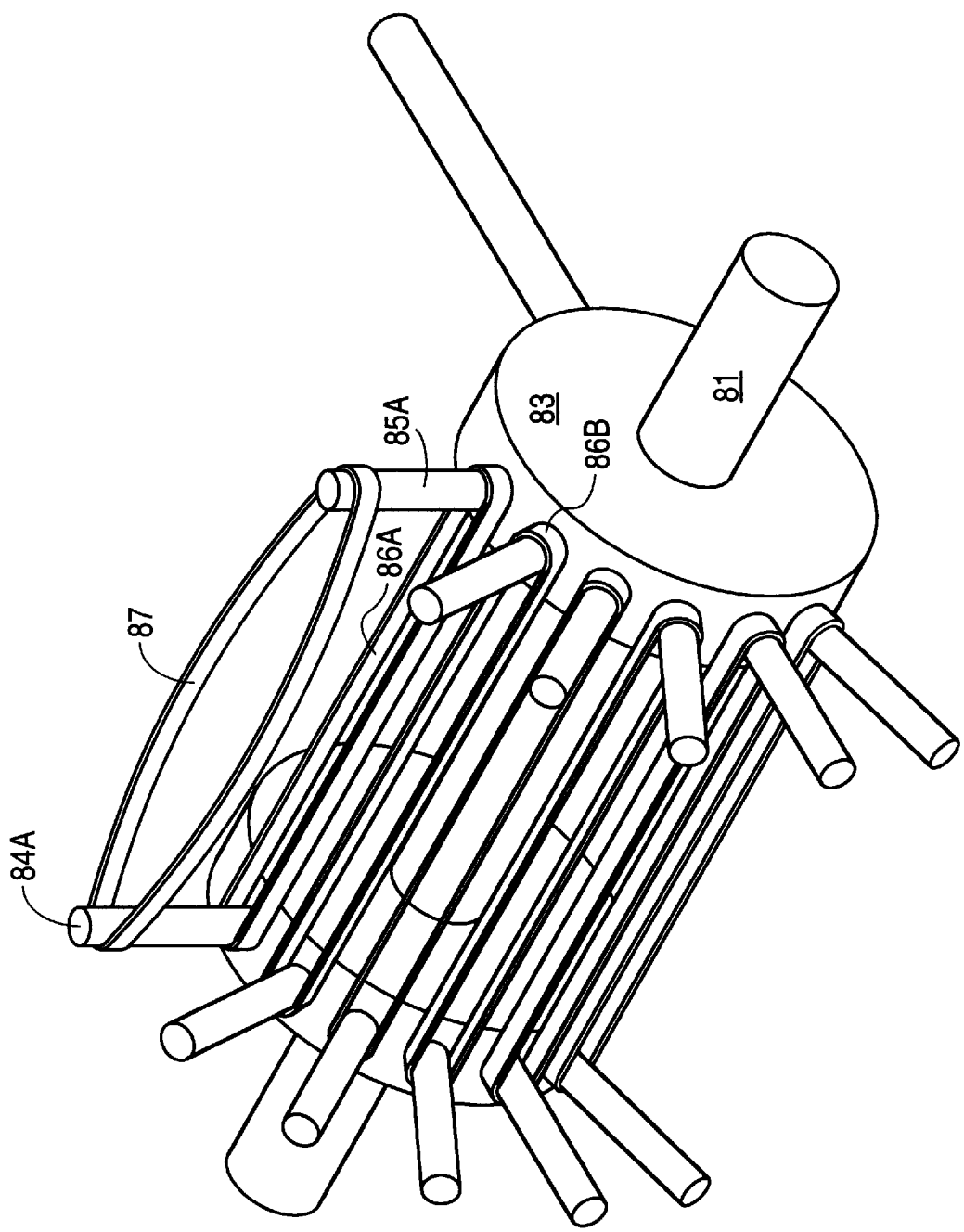
FIG. 18 is a perspective view thereof showing in addition to multiple loops of bands, a staged engagement band.
Figure 19:
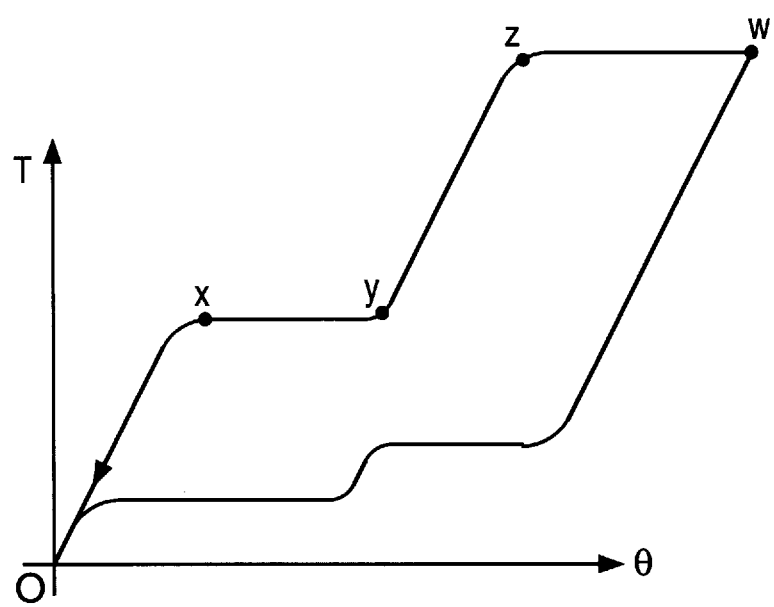
FIG. 19 illustrates a staged hysteresis thereof.

On occurrence of a deflection B1–C1 (FIG. 5) tension elements 31A–31N are loaded in tension along yield plateau A-B-C from point B so that large strains B–C (FIG. 4) needed to accommodate deflection B1–C1 can be induced in tension elements 31A–31N. During deflection B1–C1, first embodiment 30 generates a damping force F2 to oppose the force from loading. Loading beyond point C (FIG. 4) results in a form of strain hardening along segment C–H until at point H a limit strain is exceeded. "Strain hardening" refers to the resumption of an elastic deformation mechanism after exhaustion of the deformation by detwinning of the stress induced martensite. Therefore strain hardening beyond point H is a resumption of the elastic deformation of the martensite, after completion of phase transformation related deformation. For strains in excess of strain limit N (corresponding to point H) the shape memory alloy shows an increase in opposing force. Therefore, under excessive deflections, such as might be induced by an unexpectedly large earthquake, hysteretic damping apparati of the type disclosed herein provide an automatic increase in opposing force to resist the excessive deflections. A similar effect of deflection hardening can also be achieved by geometric configuration of the tension elements, for example by including in the apparatus one or more tension elements that are "staged", i.e. successively engaged only after preset deflection levels are attained, as described below in reference to FIG. 18.

If the relative motion reverses, the shape memory alloy moves along segment C1–D1 and tension elements 31A–31N elastically recover any force induced strain by deflection along segment C1–D1. With further deflection, tension elements 31A–31N follow the unloading plateau D-E-J.

As the structure reaches and passes through its original undeflected state at deflection E1, tension elements 31A–31N will have recovered "elastically" 100% of their strain and thus complete one cycle around superelastic hysteresis B-C-D-E. In so doing, tension elements 31A–31N absorb energy equal to the area of force-deflection hysteresis B1-C1-D1-E1 (FIG. 5).

On occurrence of a deflection B-A (FIG. 5), tension elements 31A–31N continue to be taut (FIG. 4) and accommodate strains B–A. Tension elements 31A–31N can be cycled through a hysteresis B-E-J-A in a manner similar to that described above in reference to hysteresis B-C-D-E.

When cycling around a hysteresis, tension elements 31A–31N absorb an exactly predictable amount of energy and convert the absorbed energy to heat. Thus, tension elements 31A–31N allow a very precise selection of an apparatus that approximates a selected force-deflection hysteresis.

The cycling of tension elements through force-deflection hysteresis as described above provides several advantages over prior art damping mechanisms, such as friction, extrusion, viscous flow, and plastic strain. Many prior art damping mechanisms leave the structure being damped in a randomly determined deflected state at the end of the dynamic loading. In contrast, apparati and methods of the type disclosed herein can automatically move the structure to its original undeflected state at the end of the dynamic loading.

Other advantages of the novel apparati and methods include non-sacrificial damping that does no damage to the shape memory material, and provides exactly repeatable damping over many dynamic loadings, in contrast to, for example, friction, plastic strain, extrusion, recrystallization that involve gross changes in material structure and properties and hence are less or not repeatable. Further, damping based on superelastic hysteresis incurs no fatigue damage from repeated loading and hence has essentially no fatigue limit making these dampers particularly suitable for repetitive loading applications—e.g. wind loaded structures—where prior art damping mechanisms are disqualified due to low cycle fatigue limitations. Additional advantages of the novel methods and apparati include exceptional corrosion resistance and frequency independent damping provided by shape memory alloy.

Basic components of a center-tapped device of this invention are at least three:

1. a rigid frame comprising the left and right fixed cross-pieces (e.g. 52 and 47) which are fixed to two struts (e.g. 50 and 51)
2. a slider frame comprising the two pieces (e.g. 53 and 48) fixed to the center strut (e.g. 49). This slider assembly slides on the guides provided by struts (e.g. 50 and 51) and the cross-piece (e.g. 47).
3. a right end connector fixed to the cross-piece (e.g. 52).

A center tapped device of this invention can be modeled by a tap connected between a first tension element and a second tension element that are supported by a first structural portion and a second structural portion respectively. The first tension element and the second tension element are pre-stretched, for example, to 3% strain. Prior to application of any external force at the tap, the first tension element and the second tension element are in equilibrium with each other, for example at point L (FIG. 4).

If the tap is moved towards the first structural portion by an external force, the second tension element extends while the first tension element contracts. When extending, the second tension element resists the external force by jumping from the point L up to the loading plateau A-B-C, for example, to point B. While contracting, the first tension element assists the movement of the tap and jumps down to the unloading plateau D-E-J, for example to point E.

During relative motion between the strain levels M and N, both the first and second tension elements can have only one of two stresses P or Q, depending on whether the tension element is expanding or contracting. If the tension element is static (i.e. not expanding or contracting) the stress level is halfway between P and Q, irrespective of the strain. During the relative motion caused by the external force, as the second tension element resists with a greater force F2 (FIG. 5) than the assisting force F1 provided by the first tension element, the total resisting force offered by the center tapped device is

F2-F1.

The moment the external force is removed, the motion of the tap is reversed. The stress level in the second tension element that was at P jumps down to Q and simultaneously, the stress level of the first tension element reverses from Q to P. The center tapped device equilibrates itself between the stress levels P and Q for the first and second tension elements, such that neither tension element moves on release of the external force and the tap remains in the deflected position, i.e. "parks". The two tension elements self-equilibrate because the stress level in the two tension elements that depends exclusively on the direction of motion balances halfway between P and Q.

A longitudinal slider mechanism 21 (FIG. 6) can be used to implement a second embodiment 40 (FIG. 7) of a center-tapped damping apparatus of the type described above by providing a first group of tension elements such as inner bands 41 and 42 (FIG. 7) that are mounted in opposition to a second group of tension elements such as outer bands 43 and 44. In the second embodiment 40, bands 41–44 are identical to each other, formed of shape memory alloy and are prestretched into approximately the middle of the strain range, for example to 3% or 4% strain.

Figure 6:
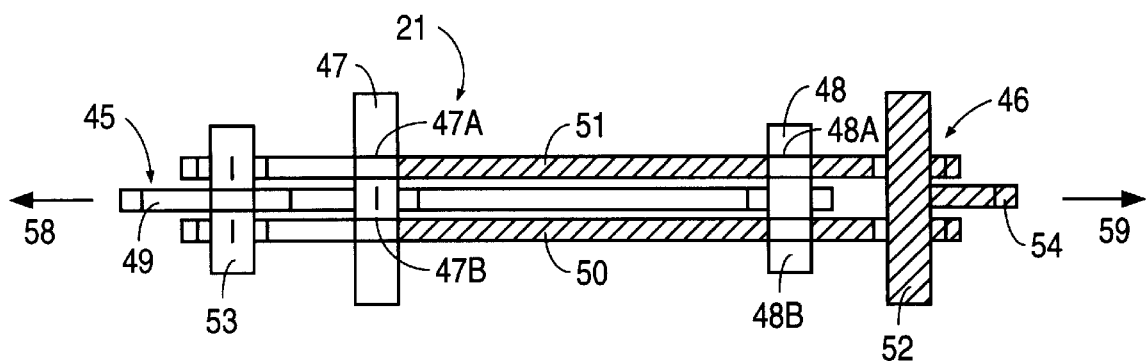
FIG. 6 is a plan view of a longitudinal slider mechanism of a damping apparatus embodiment.
Figure 7:
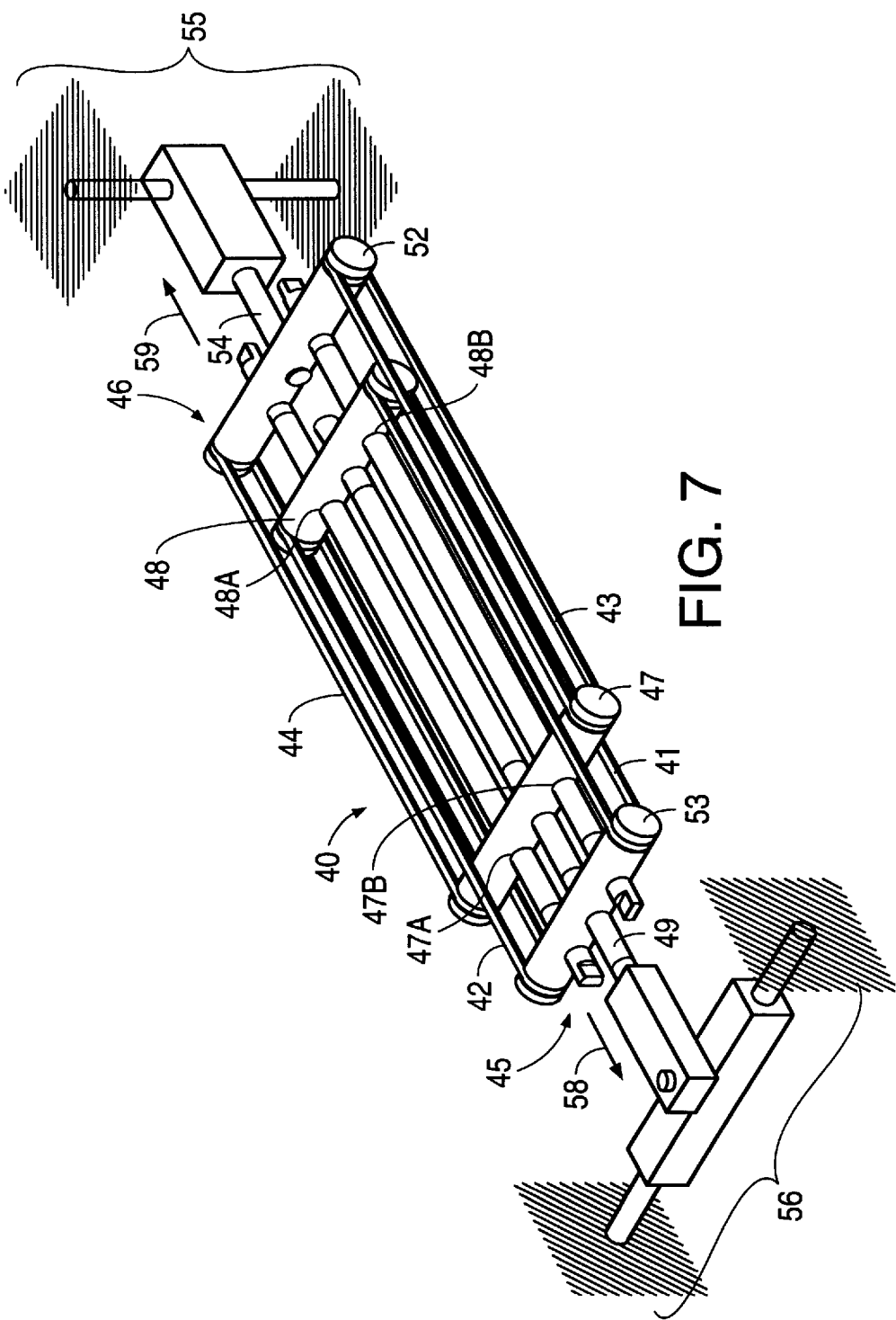
FIG. 7 is a perspective view thereof showing multiple tension elements in the form of bands.

Longitudinal slider mechanism 21 includes a first frame 45 (FIG. 6) that slides with the respect to a second frame 46 (shown hatched for clarity in FIG. 6.) First frame 45 includes two cylindrical metal rods 47 and 48 that are rigidly connected to each other by a central beam connector 49. Each of cylindrical metal rods 47 and 48 define two holes such as holes 47A, 47B and 48A, 48B respectively, that allow rods 47 and 48 to slide on parallel rails 50 and 51 of second frame 46. Rails 50 and 51 are rigidly connected between cylindrical metal rods 52 and 53 of second frame 46.

Second embodiment 40 is formed by first wrapping inner bands 41 and 42 between rods 53 and 48, followed by wrapping outer bands 43 and 44 between rods 52 and 47. The cylindrical shape of rods 47, 48, 52 and 53 permits the bands (or wires) to be easily wrapped around the rods, without any kinks that can otherwise change the force-deflection hysteresis.

To use second embodiment 40, a user can attach a beam 54 of second frame 46 that is connected to rod 52 to a first structural portion 55, and connect connector 49 to a second structural portion 56. When connectors 49 and 54 are pushed away from each other in the directions shown by arrows 58 and 59, outer bands 43 and 44 are extended while inner bands 41 and 42 are contracted. Moreover, when beams 49 and 54 are pushed toward each other, outer bands 43 and 44 are contracted whereas inner bands 41 and 42 are extended. Therefore relative motion in any direction (compressive or tension) between the first frame 49 and second frame 50 results in the same resistive force from embodiment 40.

The magnitude of resistive force F is determined by the number and thickness of the tension elements, i.e. bands 41–44. A 40 Kip capacity device with stroke of approximately 2 inches can be constructed using four bands of 51% Ni 49% Ti, width 2 inches, length 40 inches and thickness 0.125 inch. Another device of this embodiment with a force capacity of approximately 12 Kips and a stroke of approximately 3 inches can be built. Such a device weighs approximately 30 lbs and fits within an envelope of approximately 2" by 10" by 40". The tension elements of this device are four bands having a thickness of 0.060 inches. A width of 1.25 inches and a circumferential length of 60 inches.

In one specific embodiment, a few hundred turns of wire are used instead of bands. The wire can be drawn down to 20 to 30 thousandths of an inch diameter. Another embodiment uses a wire of 75 thousandths of an inch that provides good properties through the cross section of the wire, as compared to, for example, a tension bar.

Figure 8:
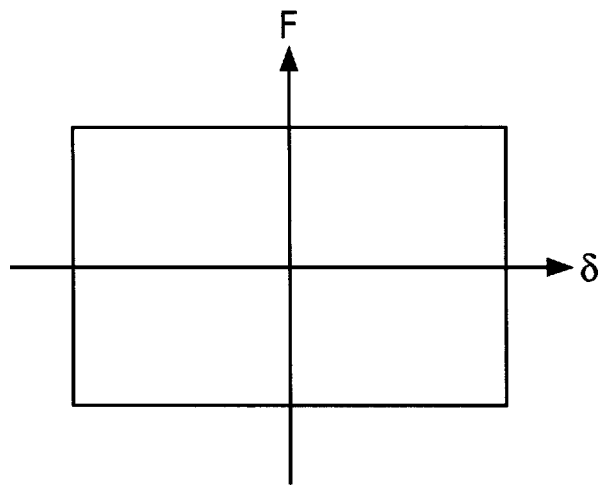
FIGS. 8 and 9 are rectangular hysteresis and rectangular flag hysteresis thereof.

When bands 41–44 are prestressed, to approximately in the middle of the stress-strain hysteresis, second embodiment 40 provides a rectangular force-deflection hysteresis, as illustrated in FIG. 8. The force-deflection hysteresis of FIG. 8 is similar to the one in FIG. 5 because longitudinal slider mechanism 21 can be formed as a combination of two block-and-tackle mechanisms 20. The force generated by use of slider mechanism 21 is the difference between the forces F1 and F2 generated at the two plateaus A-B-C and D-E-J (FIG. 5). As noted above, the hysteresis of FIG. 8 is centered at the origin and can resist compressive as well as tension forces whereas the hysteresis of FIG. 5 is wholly in the first quadrant and can only resist tension forces.

Figure 9:
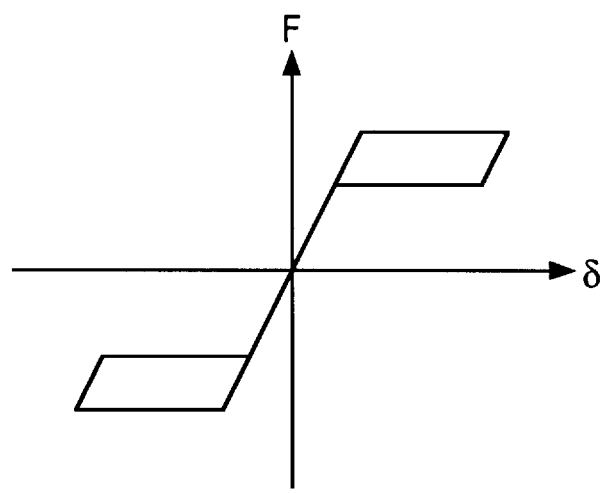

When the tension elements of second embodiment 40 do not have any prestress, the force (F)-deflection ($\delta$) hysteresis of second embodiment 44 is a rectangular flag, as illustrated in FIG. 9. The deflection "$\delta$" in FIG. 8 is deflection imposed by the structure on two components of the mechanism that is transferred to the tension elements.

Second embodiment 44 provides an automatic deflection hardening when a component of first frame 45 contacts a component of second frame 46, e.g. when rod 47 contacts rod 53 that acts as a "stop", or alternately when rod 48 contacts rod 52. Shape memory devices such as embodiment 44 can be designed such that the device deformations do not occur beyond the elastic limit strain (into the plastic range) that results in permanent yield in the material. The elastic limit strain varies for each shape memory alloy, but is typically on the order of 10% for NiTi alloys.

Figure 10:
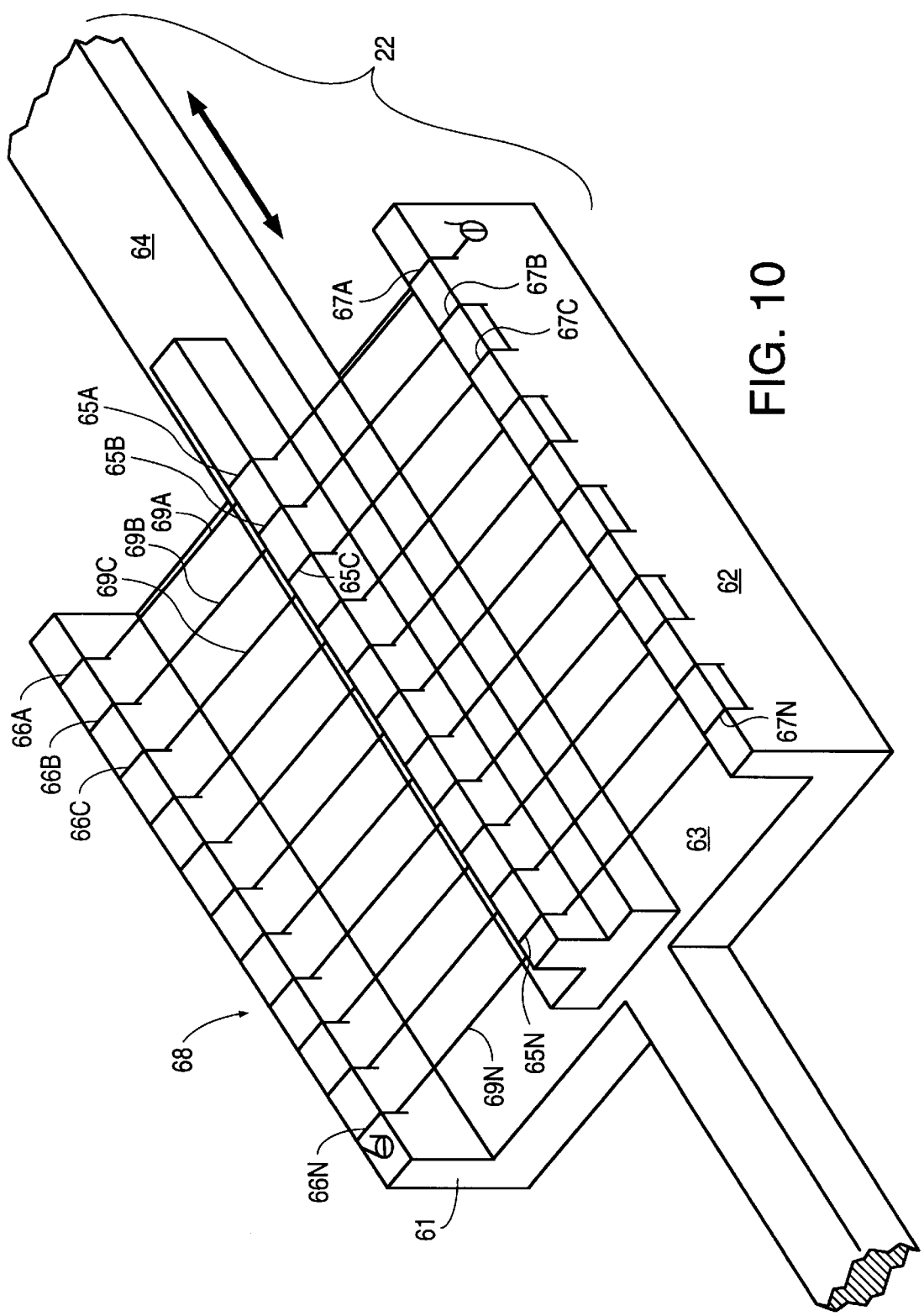
FIG. 10 is a perspective view of a transverse slider mechanism and tension elements in still another damping apparatus embodiment.

FIG. 10 illustrates a transverse slider U-shaped mechanism 22 that includes walls 61 and 62 that are rigidly coupled to each other by floor 63. A push-pull rod 64 having a number N of transverse slots, such as slots 65A–65N is mounted to reciprocate approximately parallel to and between walls 61 and 62. Wall 61 defines a number N of slots 66A–66N and wall 62 defines a number N of slots 67A–67N that are located opposite to corresponding slots 66A–66N and parallel to slots 65A–65N.

Furthermore, third embodiment 68 includes, in addition to transverse slider mechanism 22, a superelastic wire that has, for example, a number N of wire segments 69A–69N that are coupled between corresponding slots, for example, slots 66A and 67A and that pass through transverse slots, such as slot 65A of push-pull rod 64.

Figure 11:
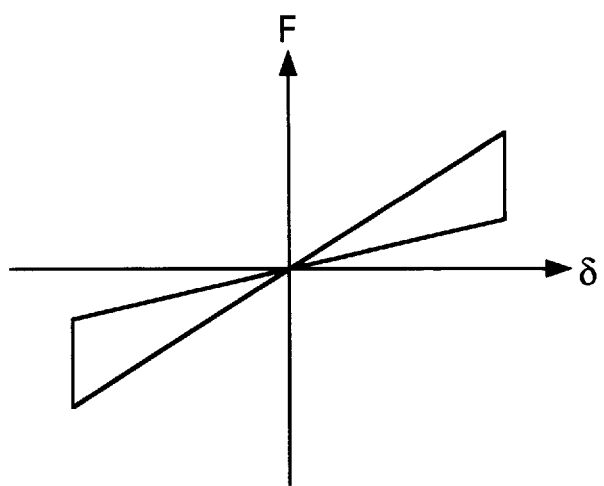
FIG. 11 illustrates the triangular flag force-deflection hysteresis thereof.

Third embodiment 68 provides a triangular flag hysteresis (FIG. 11) in response to reciprocatory motion of push pull rod 64 with respect to walls 61 and 62, in the case when wire segments 69A–69N are prestretched into a point within the superelastic strain range, for example 3%. A schematic representation of a transverse slider mechanism that produces the triangular flag hysteresis shown in FIG. 11 is a prestressed wire spanning between fixed supports. The transverse displacement of the wire from its initial position is resisted at a loading stress P, (FIG. 4) that is, the stress at which the phase transformation is induced. Upon reversal of the motion, the wire assists the motion at unloading stress Q, the stress at which reversion to parent phase occurs. Thus, the device operates by absorbing energy at a constant (device) force during increasing displacements and returning a portion of that energy at a lesser constant (device) force. Since the resultant force is the device force modulated by the sine of the angle at which the device acts, which for small angles is approximately linear, the resultant hysteresis is the characteristic triangular flag shape shown in FIG. 11

Figure 12:
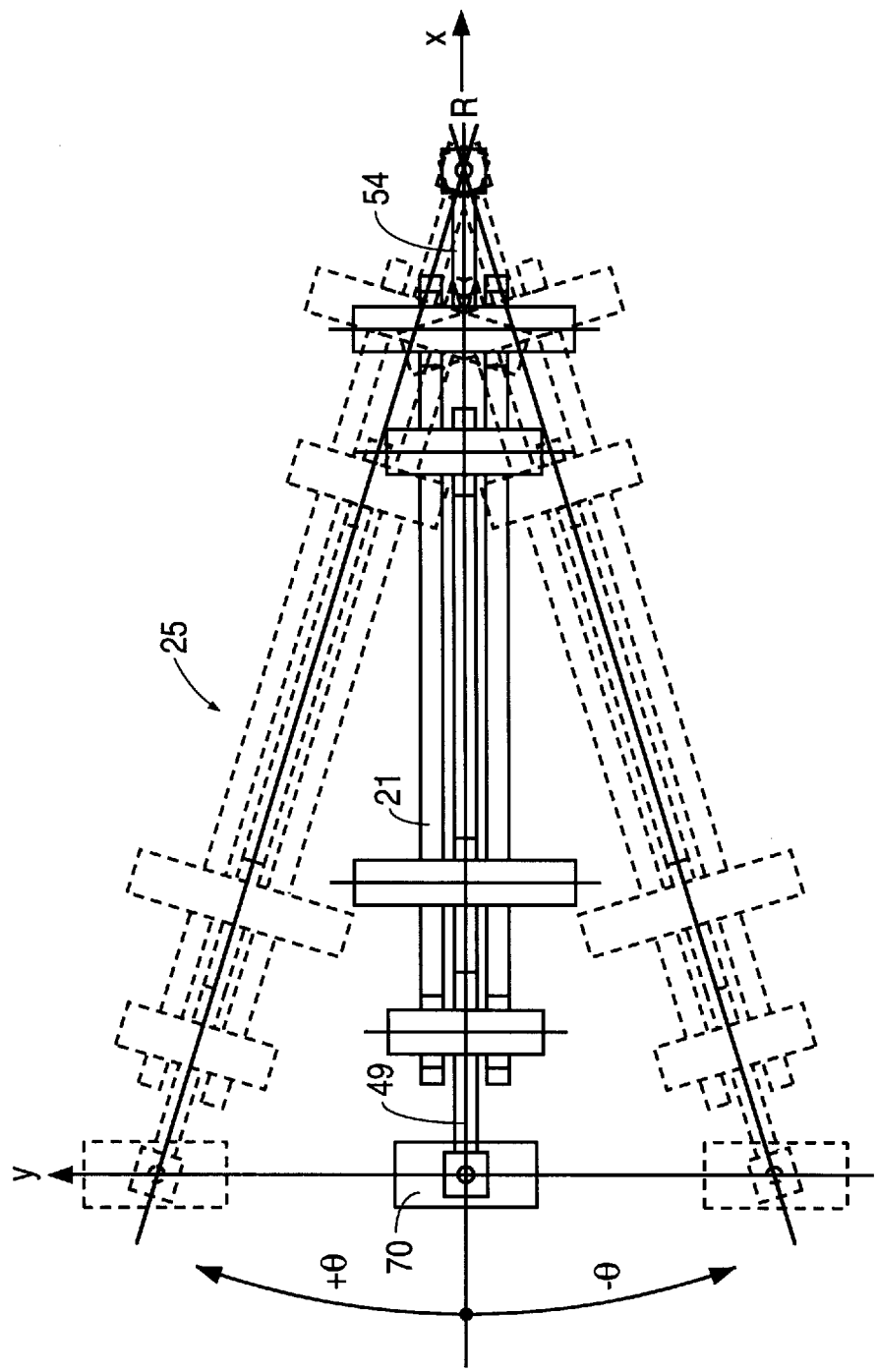
FIG. 12 is a schematic block diagram of a bow-tie slider mechanism and tension elements in another damping apparatus embodiment.

A mechanism that produces rectangular hysteresis, such as a longitudinal slider 21 can be used to replace all tension elements of third embodiment 68, to create a multi-slider mechanism 25 (FIG. 12). Connector 54 of slider 21 is rotatably coupled at point R while connector 49 is rotatably coupled to slider 70 that is constrained to reciprocate along the Y axis. As the tension elements of slider 21 make an angle θ with respect to the undeflected position of slider 21 along the X-axis, slider 21 causes slider 70 to produce the "bowtie" hysteresis of FIG. 13.

Figure 13:
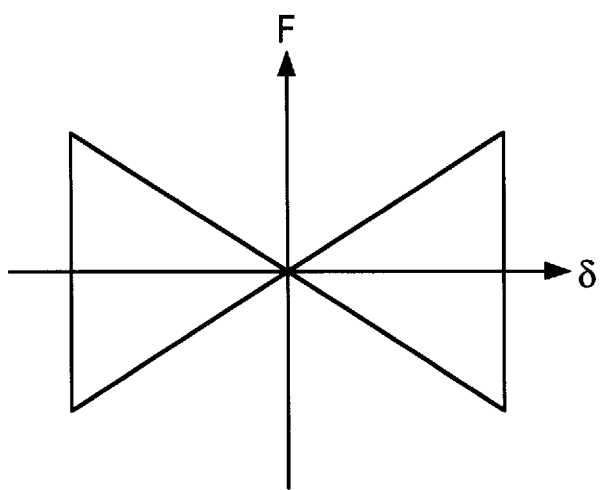
FIG. 13 illustrates the bow-tie hysteresis thereof.

Instead of longitudinal slider mechanism 21, any other type of mechanism that produces a constant force independent of deflection, such as a coulomb friction damper can also be used to produce a bow tie force-deflection hysteresis (FIG. 13).

Figure 15:
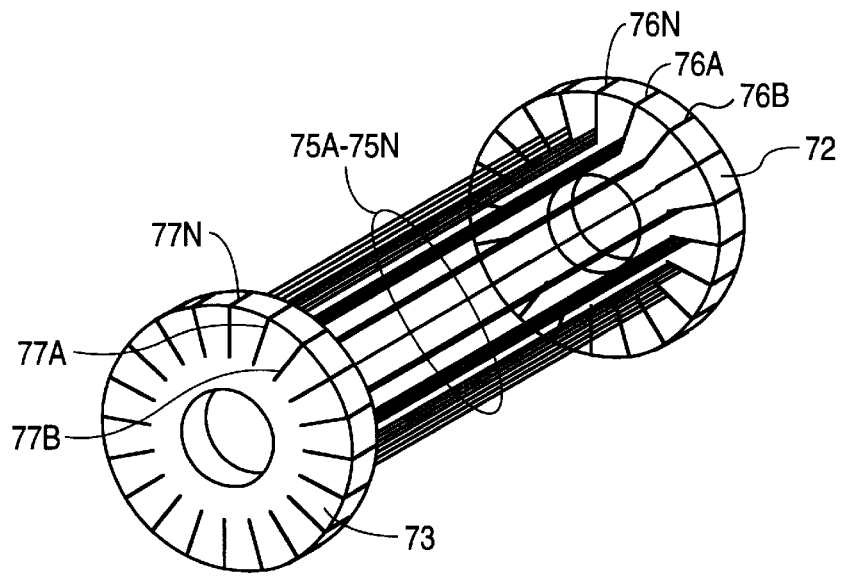
FIG. 15 is a perspective view of a pair of slotted discs and multiple tension elements used thereof.
Figure 16:
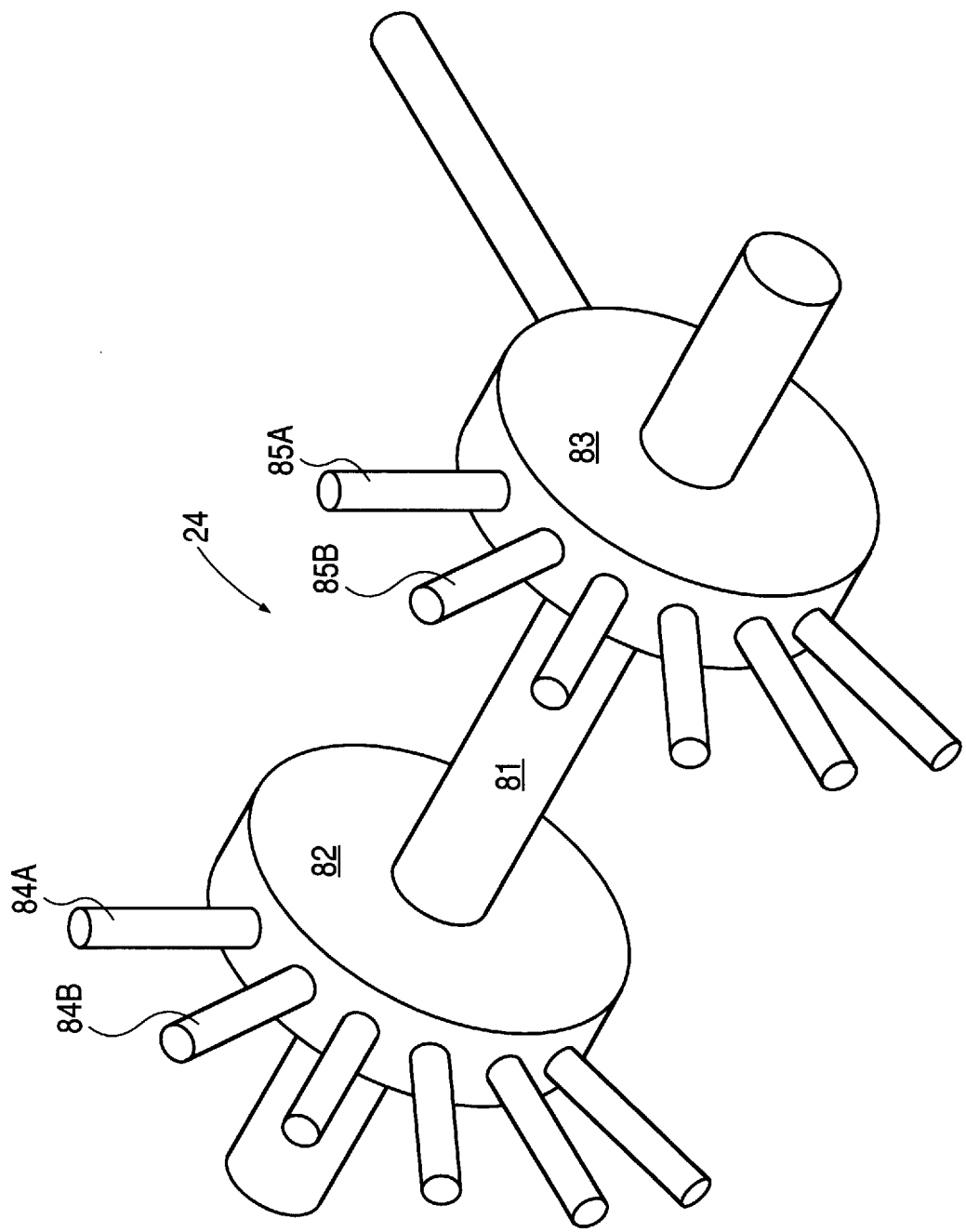
FIG. 16 is a perspective view of a torsional mechanism of a damping apparatus embodiment.

Yet another embodiment (FIGS. 14 and 15) uses a draft gear mechanism 23 that includes a push-pull rod 71 that is slidably mounted between two slotted disks 72 and 73 that are separated from each other by stops 74a and 74b in housing 74. The stops 74a and 74b are welded on housing 74 after insertion of the rod 71 and disks 72 and 73 into the housing 74. A number N of wire segments 75A–75N 95 of shape memory alloy wire are arranged between opposite slots, such as slot 76A of disk 72 and slot 77A of disk 73. When push pull rod 71 is pushed in the direction indicated by arrow 78, push pull rod 71 pushes disk 73 away from the stop in housing 74, whereas disk 72 is held stationary by housing 74, so that wire segments 75A–75N are stretched. A similar, but opposite effect occurs when push pull rod 71 is pulled in a direction shown by arrow 79 that is opposite to the arrow 78, and segments 75A–75N are again stretched.

Irrespective of the amount of prestretch in wire segments 75A–75N draft gear mechanism 23 can be used to provide a rectangular flag hysteresis of the type discussed above.

Yet another embodiment (FIG. 16) of this invention includes a torsion mechanism 24 that includes a central shaft 81 that supports two disks 82 and 83 at a distance from each other, wherein disk 82 is mounted rotatable with respect to disk 83. Both disks 82 and 83 have a number N of posts, 86A–86N and 85A–85N mounted on their respective peripheries. For clarity, not all of the posts are illustrated in FIGS. 16–19, although in one embodiment each of disks 82 and 83 has an equal number of posts that are mounted all around the peripheries equidistant from each other. Tension elements, such as band 86A–86N (FIG. 17) are arranged substantially parallel to central shaft 81 between two corresponding posts, such as posts 84A and 85A of disks 82 and 83 respectively.

When disk 82 is rotated with respect to fixed disk 83, torsion mechanism 24 can provide a rectangular flag torque-angle hysteresis (of the type shown in FIG. 9) without need for any prestress in bands 86A–86N. With prestress in bands 86A–86N, torsion mechanism 24 can provide a rectangular torque-angle hysteresis. In a variation of this embodiment, a stage tension element, such as band 87 (FIG. 18) that has a larger circumferential length than other bands 86A–86N is used to provide a staged effect, in which the staged tension element(s) effects the torque-angle hysteresis only beyond a critical angle, that can be selected by the user. Such a staged effect can be a hardening effect, for example as illustrated torque T -angle θ hysteresis of FIG. 19 wherein bands 86A–86N provide plateau X-Y and band 87 initiates the hardening at point Y and provides the plateau Z-W.

A staged effect of softening can be implemented for example by use of a prestretched band that snaps (breaks) beyond a selected angle.

Figure 20:
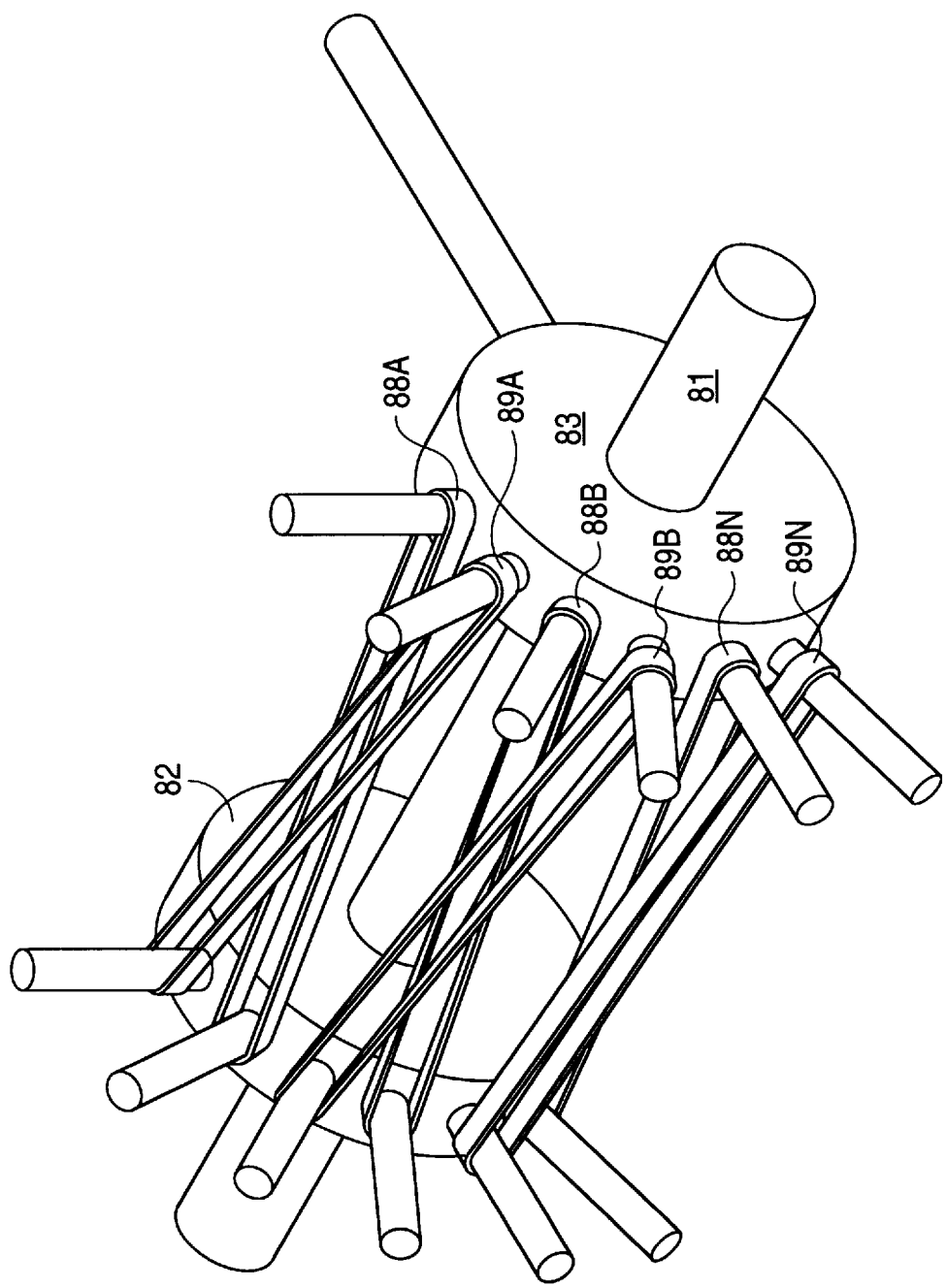
FIG. 20 is another perspective view thereof showing multiple loops of tension elements that are oblique to one-another and to the central shaft.

Tension elements can also be mounted oblique with respect to central shaft 81, as illustrated by bands 88A–88N and 89A–89N in FIG. 20, in another variation of this embodiment. Although discs 82 and 83 are illustrated as having circular peripheries in the embodiment of FIGS. 17–19, peripheries of discs 82 and 83 can have other shapes, even irregular shapes.

In a simple generalization of the staging method described above in reference to FIG. 18, successively engaging superelastic elements having any selected stress-strain distribution—e.g. tension, bending, torsion, or compression—can be utilized to provide a wide variety of force-deflection characteristics with various stages of softening or hardening. Staging can be implemented by use of any of the mechanism described herein, including longitudinal slider mechanism 21. In one specific embodiment, a first group of wires are fully engaged over the entire strain range and a second group of wires are engaged at the occurrence of 2% strain in the first group of wires. The resulting hysteresis is the sum of the hysteresis of the two wires groups. Therefore, staged engagement provides a useful means of controlling the force-deflection hysteresis of a passive damping device.

Various factors, such as the frequency and amplitude of the vibrations to be damped, the force to be exerted by the hysteretic damping apparatus, the temperature range over which damping must be effective, and the corrosive environment in which the apparatus must operate, can be used to determine the various characteristics, such as the shape and size of the tension elements.

For example, a damping apparatus that must operate in a corrosive salt water environment such as a damper for an offshore marine platform can use tension elements formed of one of the nickel titanium subfamily that have excellent corrosion resistant properties whereas one in a less corrosive environment can use a less expensive copper based alloy or another of the shape memory alloys. As another example, a damper operating in a controlled building having a stable temperature environment where the maximum temperature excursions are on the order of 5° C. from the mean operating temperature of 60° F. a user can select sizes and shapes that maximize the surface area relative to the volume of material required, such as small diameter wires of for example, 20 thousandths inch in diameter and carefully space the wires to maximize the circulation of air, around these wires. In a marine environment where there is circulating salt water around the elements, size and not shape of the tension elements can be optimized for other reasons, and can result in use of larger diameter wires or bars, such as quarter inch, eighth inch, even three quarters of an inch diameter. To resist corrosion and because the temperature is not as critical, a user can use such larger tension elements which are cheaper or have better thermomechanical processing characteristics.

The size, shape and form of the tension elements can also be influenced by the cyclic demands of a particular application. For example, high cyclic loadings such as wind loadings which are for example, hundreds of thousands of cycles can result in selection of materials such as the nickel and titanium family as opposed to the copper family. For some high cycle applications the user may prefer smaller diameter tension elements, such as wires with small diameters on the order of 0.025 mm up to 0.25 mm because of their capacity to take tighter radius and have better uniformity because of better thermomechanical processing and working harder material.

The above description of the preferred embodiment of this invention is intended to be illustrative and not limiting. Other embodiments of this invention will be obvious to those skilled in the art in view of the above disclosure. For example, both shape-memory effect (SME) and superelastic effect (SEE) hysteresis can be used for the design of linkage, joint, constrained layer, and mass damping devices to obtain a variety of hysteresis.

Various modifications and adaptations of the embodiments disclosed herein are encompassed by the attached claims.

We claim:

1. A damping apparatus for absorbing a portion of the energy of an estimated vibratory dynamic loading on the apparatus, the apparatus comprising:

a first member fixedly attached to a first structural portion of a stationary structure to be damped, the first structural portion being the path through which the vibratory dynamic loading is transmitted to the apparatus, the first structural portion being stationary other than during the vibratory dynamic loading;

a second member attached to a second structural portion of the to be damped structure such that relative motion occurs between said first structural portion and said second structural portion when the vibratory dynamic loading of the to be damped structure occurs, the second structural portion being stationary other than during the vibratory dynamic loading;

a number of superelastic tension elements arranged between and coupled to said first and second members, said tension elements being located such that vibratory motion between said first and second members causes strain in the elements, said elements being of a number and length such that the relative motion between said first and second members is within the superelastic strain of said tension elements and said tension elements absorb and damp at least a portion of the energy of the vibratory dynamic loading.

2. The apparatus of claim 1 wherein prior to a dynamic loading, said tension elements are prestretched tension elements prestretched to partway through a superelastic strain range such that relative motion of the tension members strains the tension elements and causes energy absorption.

3. The apparatus of claim 2 wherein said relative motion relaxes said tension elements, and further wherein said tension elements remain taut during said relative motion.

4. The apparatus of claim 1 wherein subsequent to application of the vibratory dynamic loading, a restoring elastic force in said tension elements tends to restore said first and second members to a position of said first and second members prior to the vibratory dynamic loading.

5. The apparatus of claim 1 wherein said first member and said second member are stirrups arranged to form a block-and-tackle mechanism, wherein during said relative motion said stirrups reciprocate with respect to each other in a direction parallel to the longitudinal direction of the tension elements.

6. The apparatus of claim 5 wherein said tension elements are formed of shape memory alloy wire and the number and length of said tension elements can be varied by wrapping multiple loops of said wire between said stirrups.

7. The apparatus of claim 1 wherein said relative motion is rotary.

8. The apparatus of claim 1 wherein said relative motion is a combination of translation and rotation.

9. The apparatus of claim 1 wherein prior to application of a dynamic loading, at least one of said elements has a prestrain substantially different from the prestrain of another of said elements, said difference providing a staging effect in the response of said apparatus to said dynamic loading.

10. The apparatus of claim 9 wherein said staging effect is a hardening effect provided by slack in one of said elements.

11. The apparatus of claim 9 wherein said staging effect is a softening effect provided by prestrain in one of said elements.

12. The apparatus of claim 1 wherein said relative motion is approximately perpendicular to the longitudinal direction of said tension elements.

13. The apparatus of claim 1 comprising two groups of said tension elements, each of said tension elements being prestrained tension elements prestrained partway through the superelastic strain region, wherein a first group of said tension elements is arranged in opposition to a second group of said tension elements such that said relative motion extends tension elements in one of said groups, while allowing elastic contraction of tension elements in said opposing group.

14. A hysteretic damping apparatus for damping vibration of a stationary structure to be damped, the structure being stationary other than during the vibration, said apparatus comprising:

a plurality of tension elements formed of a shape memory alloy; and a mechanism comprising a first component and a second component, said mechanism being capable of transforming at least a portion of the vibration of the structure into relative motion between said first component and said second component when said mechanism is coupled to the structure said tension elements being coupled in tension between said first component and said second component such that at least a portion of said relative motion cycles said tension elements in tension through the superelastic stress-strain hysteresis of said shape memory alloy to convert at least a portion of energy from the vibration into heat.

15. The hysteresis damping apparatus of claim 14 wherein said tension elements are deformable tension elements deformable by the vibration of the structure resulting in a strain induced change in the amount of a thermoelastic martensite phase from an austenite phase in said tension elements.

16. The hysteresis damping apparatus of claim 14 where the number and length of said tension elements are varied as dictated by an estimated vibration load excursion to which the tension elements are to be subjected.

17. The hysteresis damping apparatus of claim 16 wherein tension in said tension elements after said excursion will be restored to a tension condition existing prior to said excursion.

18. The hysteresis damping apparatus of claim 16 wherein the tension elements are pre-stressed tension elements pre-stressed part way through their superelastic strain range permitting both elongation and contraction of the tension elements by said excursion followed after said excursion by restoration of the tension elements to a restored original length.

19. The hysteresis damping apparatus of claim 18 wherein a first group of the tension elements are arranged to oppose movement of a second group of the tension elements such that extension of one of said groups of tension elements results in contraction of the other group of the tension elements and a rectangular force/deflection behavior is afforded.

20. The hysteresis damping apparatus of claim 18 wherein said tension elements are pre-stressed to different levels of pre-stressing such that the response of particular tension elements to loading conditions is varied over the load excursion.

21. The hysteresis damping apparatus of claim 14 wherein the relative motion of the components are transverse of a longitudinal axis of said tension elements such that a triangular flag force/deflection behavior is afforded.

22. The hysteretic damping apparatus of claim 14 wherein the length and thickness of said tension elements are selected to absorb the energy from the vibration.

23. The hysteretic damping apparatus of claim 18 wherein the relative motion strains said tension elements.

24. The hysteretic damping apparatus of claim 14 wherein the tension elements are prestrained tension elements and wherein relative motion releases the preexisting strain in said tension elements.

25. The hysteretic damping apparatus of claim 14 wherein said shape memory alloy is capable of transformation from a first phase into a second phase during the cycling and further wherein said shape memory alloy comprises said first phase and said second phase prior to the dynamic motion.

26. The hysteretic damping apparatus of claim 25 wherein said first phase is austenite and said second phase is martensite.

27. The hysteretic damping apparatus of claim 26 wherein said second phase is formed by a prestress force and at least a portion of said second phase reverts to said first phase in response to the relative motion.

28. The hysteretic damping apparatus of claim 14 wherein each one of said tension elements has the form of a loop of wire.

29. The hysteretic damping apparatus of claim 14 wherein each one of said tension elements has the form of a band.

30. The hysteretic damping apparatus of claim 14 wherein said mechanism is a longitudinal slider mechanism comprising two frames capable of sliding with respect to each other on a support rail, wherein said tension elements are two groups of bands coupled between said two frames such that relative motion in a first direction is opposed by a first group of bands and assisted by a second group of bands and relative motion in a second direction is opposed by said second group of bands and assisted by said first group of bands.

31. The hysteretic damping apparatus of claim 14:
wherein said mechanism is a torsion mechanism comprising a stationary disc and a rotatable disc separated from each other by a central shaft, said rotatable disc being capable of rotary motion with respect to said stationary disc;
further wherein said first component is a first post mounted on a periphery of said rotatable disc and said second component is a second post mounted on a periphery of said stationary disc.

32. The hysteretic damping apparatus of claim 31 further comprising a loose band of shape memory alloy wherein said loose band is tightened during said relative motion.

33. The hysteretic damping apparatus of claim 14 wherein said plurality of tension elements are stretched when said first component and said second component are moved towards each other; and
further wherein said plurality of tension elements are stretched when said first component and said second component are moved away from each other.

34. The hysteretic damping apparatus of claim 33 wherein said mechanism is a draft gear mechanism comprising a push-pull rod slidably mounted between said first component and said second component, wherein application of a force in a first direction on said push-pull rod moves said first component and further wherein application of a force in a second direction on said push-pull rod moves said second component, said second direction being opposite said first direction.

35. The hysteretic damping apparatus of claim 33 wherein said first component and said second component are each a disc having peripheral slots, said tension elements being supported within said slots.

36. The hysteretic damping apparatus of Claim 14 wherein said relative motion causes a portion of at least one of said tension elements to be deflected in a direction transverse to a longitudinal direction of said tension elements.

37. A hysteretic damping method comprising:
determining an expected vibratory dynamic loading of a stationary structure to be damped, the structure being stationary other than during the expected vibratory dynamic loading;
selecting a force-deflection hysteresis for dissipating energy generated by the expected vibratory dynamic loading;
selecting a hysteretic damping apparatus comprising a tension element formed of shape memory alloy such that said hysteretic damping apparatus approximates said force-deflection hysteresis;
selecting physical properties of said tension element such that on cycling through the superelastic stress-strain hysteresis, said apparatus is capable of dissipating at least a portion of the vibratory dynamic loading; and
coupling said hysteretic damping apparatus to said stationary structure to be damped.

38. The hysteretic damping method of claim 37 wherein said step of selecting physical properties comprises selecting the composition of material, size, shape, heat treatment, number, distribution and manner of connection of said tension elements.

39. A combination comprising: a fixed structure to be damped; and a damping apparatus coupled to said fixed structure, said damping apparatus comprising:
a first member and a second member attached to said fixed structure, said first member and said second member having vibratory motion in response to vibration of said fixed structure; and
a plurality of tension elements arranged between said first member and said second member, said plurality of tension elements converting at least a portion of said vibratory motion into heat.

40. The combination of claim 39 wherein said tension elements are formed of a shape memory alloy.

41. The combination of claim 40 wherein at least a portion of said relative motion cycles said tension elements in tension through a superelastic stress-strain hysteresis of said shape memory alloy.

42. The combination of claim 39 wherein said tension elements are deformable tension elements deformable by the vibration of the fixed structure resulting in a strain induced change in the amount of a thermoelastic martensite phase from an austenite phase in said tension elements.

43. The combination of claim 39 herein the tension elements are pre-stressed tension elements pre-stressed part way through their superelastic strain range permitting both elongation and contraction of the tension elements.

44. The combination of Claim 39 wherein a first group of the tension elements are arranged to oppose movement of a second group of the tension elements such that extension of one of said groups of tension elements results in contraction of the other group of the tension elements.

45. The combination of claim 39 wherein the relative motion strains said tension elements.

46. The combination of claim 39 wherein the tension elements are prestrained tension elements and wherein relative motion releases the preexisting strain in said tension elements.

47. The combination of claim 39 wherein the second member is capable of relative linear motion along a first direction during the vibratory motion, and the combination further includes:

a third member capable of relative linear motion in a second direction, wherein said second direction is approximately perpendicular to said first direction, and the third member is coupled to the second member to provide a bowtie force deflection hysteresis.

48. A damping apparatus for absorbing a portion of the energy of an estimated vibratory dynamic loading on the apparatus, the apparatus comprising:

a first member fixedly attached to a first structural portion of a stationary structure to be damped, the first structural portion being the path through which the vibratory dynamic loading is transmitted to the apparatus, the first structural portion being stationary other than during the vibratory dynamic loading;

a second member attached to a second structural portion of the to be damped structure such that relative motion occurs between said first structural portion and said second structural portion when the vibratory dynamic loading of the to be damped structure occurs, the second structural portion being stationary other than during the vibratory dynamic loading;

at least one superelastic tension element arranged between and coupled to said first and second members, said tension element being located such that vibratory motion between said first and second members causes strain in the element, said element being of a length such that the relative motion between said first and second members is within the superelastic strain of said tension element and said tension element absorb and damp at least a portion of the energy of the vibratory dynamic loading.

49. A hysteretic damping apparatus for damping vibration of a stationary structure to be damped, the structure being stationary other than during the vibration, said apparatus comprising:

at least one tension element formed of a shape memory alloy; and a mechanism comprising a first component and a second component, said mechanism being capable of transforming at least a portion of the vibration of the structure into relative motion between said first component and said second component when said mechanism is coupled to the structure, said tension element being coupled in tension between said first component and said second component such that at least a portion of said relative motion cycles said tension element in tension through the superelastic stress-strain hysteresis of said shape memory alloy to convert at least a portion of energy from the vibration into heat.

50. A hysteretic damping method comprising:

determining an expected vibratory dynamic loading of a stationary structure to be damped, the structure being stationary other than during the expected vibratory dynamic loading;

selecting a force-deflection hysteresis for dissipating energy generated by the expected vibratory dynamic loading;

selecting a hysteretic damping apparatus comprising a tension element formed of shape memory alloy such that said hysteretic damping apparatus approximates said force-deflection hysteresis;

selecting physical properties of said tension element such that on cycling through the superelastic stress-strain hysteresis, said apparatus is capable of dissipating at least a portion of the vibratory dynamic loading; and coupling said hysteretic damping apparatus to said stationary structure to be damped.

51. A combination comprising: a fixed structure to be damped; and a damping apparatus coupled to said fixed structure, said damping apparatus comprising:

a first member and a second member attached to said fixed structure, said first member and said second member having vibratory motion in response to vibration of said fixed structure; and at least one tension element arranged between said first member and said second member, said tension element converting at least a portion of said vibratory motion into heat.

* * * * *